US012802356B2

(12) United States Patent
Foco et al.

(10) Patent No.: US 12,802,356 B2
(45) Date of Patent: Nov. 17, 2026

(54) REPLICATING PHYSICAL ENVIRONMENTS AND GENERATING 3D ASSETS FOR SYNTHETIC SCENE GENERATION

(71) Applicant: Nvidia Corporation, Santa Clara, CA (US)

(72) Inventors: Marco Foco, Origlio (CH); András Bódis-Szomorú, Zurich (CH); Isaac Deutsch, Zurich (CH); Artem Rozantsev, Zurich (CH); Michael Shelley, Munich (DE); Gavriel State, Toronto (CA); Jiehan Wang, Toronto (CA); Anita Hu, New Market (CA); Jean-Francois Lafleche, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 103 days.

(21) Appl. No.: 18/066,135

(22) Filed: Dec. 14, 2022

(65) Prior Publication Data

US 2024/0203052 A1 Jun. 20, 2024

(51) Int. Cl.

*G06T 17/20* (2006.01)
*G06T 7/33* (2017.01)
*G06V 10/82* (2022.01)

(52) U.S. Cl.

CPC ................ *G06T 17/20* (2013.01); *G06T 7/33* (2017.01); *G06V 10/82* (2022.01); *G06V 2201/07* (2022.01)

(58) Field of Classification Search

CPC ........... G06T 17/20; G06T 7/33; G06T 19/20; G06T 17/00; G06V 10/82; G06V 2201/07; G06V 10/26; G06V 20/64; G06V 20/70

See application file for complete search history.

(56) References Cited

U.S. PATENT DOCUMENTS

| | | | | |
|---|---|---|---|---|
| 11,069,134 | B2 * | 7/2021 | Szasz | G06T 19/20 |
| 11,210,851 | B1 * | 12/2021 | Nussbaum | H04W 4/021 |
| 2008/0071559 | A1 * | 3/2008 | Arrasvuori | G06F 3/011 705/26.1 |
| 2010/0214284 | A1 * | 8/2010 | Rieffel | G06T 17/00 382/154 |
| 2021/0279957 | A1 * | 9/2021 | Eder | G06T 7/80 |
| 2023/0042369 | A1 * | 2/2023 | Böckem | G06T 17/05 |
| 2024/0119678 | A1 * | 4/2024 | Berger | G06T 7/20 |

* cited by examiner

*Primary Examiner* — William A Beutel

(74) *Attorney, Agent, or Firm* — Hogan Lovells Cadwalader US LLP

(57) ABSTRACT

Approaches presented herein can provide for the automatic generation of a digital representation of an environment that may include multiple objects of various object types. An initial representation (e.g., a point cloud) of the environment can be generated from registered image or scan data, for example, and objects in the environment can be segmented and identified based at least on that initial representation. For objects that are recognized based on these segmentations, stored accurate representations can be substituted for those objects in the representation of the environment, and if no such model is available then a mesh or other representation of that object can be generated and positioned in the environment. A result can then include a 3D representation of a scene or environment in which objects are identified and segmented as individual objects, and representations of the scene or environment can be viewed, and interacted with, through various viewports, positions, and perspectives.

19 Claims, 20 Drawing Sheets

REPLICATING PHYSICAL ENVIRONMENTS AND GENERATING 3D ASSETS FOR SYNTHETIC SCENE GENERATION

BACKGROUND

There are various situations where it can be useful or beneficial to obtain a virtual reconstruction of a physical environment. This may include, for example, generating a digital representation, such as a three-dimensional model, that corresponds to that environment. Existing approaches to generate such a representation can utilize data obtained by scanning such an environment, but these existing approaches typically only generate a single three-dimensional representation of the environment as a whole, and do not segment the environment into individual regions or portions that may correspond to different aspects of the environment. Attempts to segment individual objects in the environment, as well as to identify or modify representations of objects in that environment, typically require at least some amount of manual interaction, which can be burdensome or complicated for many users, and may produce less than optimal results.

BRIEF DESCRIPTION OF THE DRAWINGS

Various embodiments in accordance with the present disclosure will be described with reference to the drawings, in which.

DETAILED DESCRIPTION

Figure 1A:
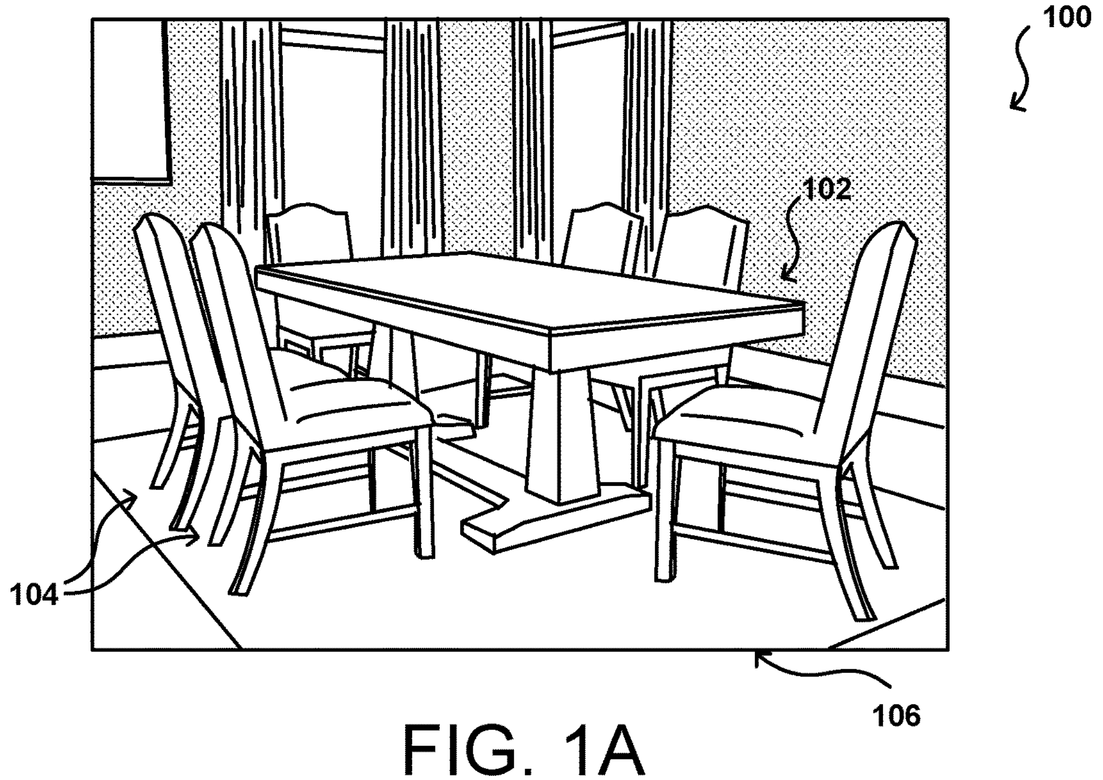
FIGS. 1A and 1B illustrate a captured image of a scene and a reconstructed image of a scene that can be generated in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments can provide for the automatic generation of virtual or digital representations of an environment or scene, which may include multiple objects that may be of various object types. In at least one embodiment, a reconstruction system can utilize an end-to-end process to generate a representation of an environment, in which objects in the environment can be segmented and identified based on the captured image data. As used herein, "image data" will be used to refer generally to any type of data that is representative of one or more visual aspects of one or more surfaces of one or more objects in a scene or environment, as may include sensor data, LIDAR data, RGB-D data, video sequences, and the like. For objects that are classified, such as objects that match images and other representations from a catalog or repository of three-dimensional (3D) models, stored 3D geometry representing the actual shape or dimensions of the objects can be used, and for other objects a new estimated 3D reconstruction/approximation (e.g., mesh) can be generated. This representation can be generated by capturing video data, such as RGB-D data, for a scene (without the necessity of slower, user or compute intensive techniques such as motion capture, etc.), multiple images, or even a single image. This can be performed as part of an offline process or an online, real-time process where a user can be provided feedback in real time, such as where sufficient data has not been scanned for an object. Keypoints in the environment or scene can be identified and used for camera tracking, as well as for assisting with model reconstruction. The image and/or video data can be analyzed to generate a 3D model or representation of the environment, which can then be analyzed using one or more models (that may be class-specific) to identify segments of this model that correspond to individual objects of those classes. Vector or latent representations of these objects can be generated and compared to a library or repository of objects in order to accurately identify these objects. A result can then be a 3D representation of a scene or environment in which objects are identified and segmented as individual objects, and representations (e.g., images) of the scene or environment can be viewed and interacted with through various viewports, positions, and perspectives.

Advantages of generation of such representations can be obtained in various applications and for various use cases. These can include, by way of example and without limitation, use in vehicles to generate a model of a surrounding environment (including accurate representations of identified objects) for navigation and safety. Use cases can also relate to shopping, where such a representation can help a customer to identify, move, modify, place, or otherwise view objects that customer might want to purchase for a space (e.g., for home design or shopping), as well as for design or object manipulation based on limitations of a scene or environment Such approaches can also be used advantageously to determine how a human or robot should interact with a scene based at least on understanding the objects and placement in the environment, as well as to generate augmented reality (AR), virtual reality (VR), enhanced reality content, or simulation and synthetic data generation that is accurate for a scene or environment, including for individual objects in the scene with which a user may be able to interact. Such approaches can also be beneficial in scanning and classifying real world objects to add to a virtual environment, such as an item that is to be added as a usable virtual object in a video game, or an item that is available through an e-commerce platform and may be viewable in various potential placements.

Variations of this and other such functionality can be used as well within the scope of the various embodiments as would be apparent to one of ordinary skill in the art in light of the teachings and suggestions contained herein. The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1A illustrates an example image 100 of an environment that may be captured by a camera or other imaging sensor in accordance with various embodiments. This may be a single image, image in an image sequence, video frame of a video capture, stereoscopic image or image with depth data, among other such options. An environment can include any physical (or virtual) location, region, or area in which at least a portion of that region may be captured within a field of view (or other view or capture area) of at least one camera, sensor, or device, where that region may include one or more foreground or background objects. As illustrated in the image, this environment (or "scene") includes multiple objects, such as a table 102, chairs 104, a rug 106, and various background objects, among others. Other environments may include different numbers, types, arrangements, and selections of objects as well. In at least one embodiment, such an image (as well as potentially other related images or data for the environment) can be analyzed to attempt to generate a virtual or digital representation of this environment. Such a representation may include, for example, a three dimensional model, mesh, or point cloud representing the shapes and relative placement of objects in the environment.

Figure 1B:
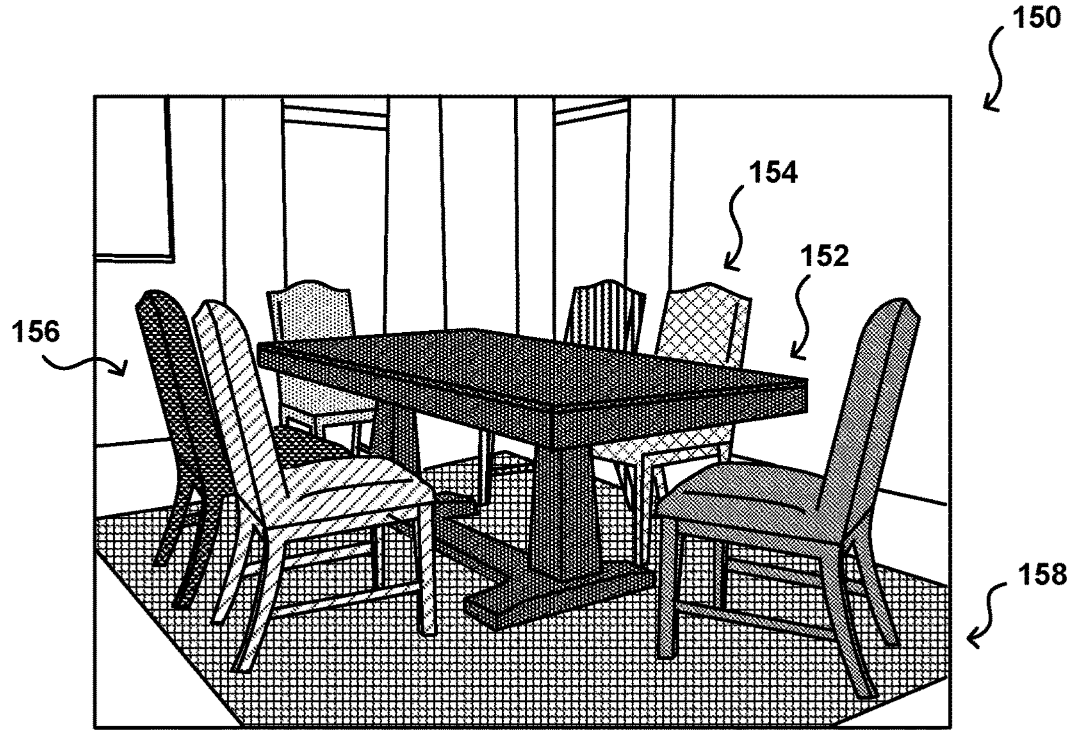

In many situations, it can be useful or beneficial to be able to generate a representation that includes individual representations, or segmentations, that correspond to individual objects in a scene. This can be performed during generation of the representation of the environment as a whole, or by analyzing such an initial representation. Such a representation can then include separate segmentations for individual items such as the table 152, individual chairs 154, 156, and rug 158 for the example environment as illustrated in FIG. 1B. Being able to generate separate two- or three-dimensional (3D) representations for these objects can provide several potential advantages. One advantage is that knowing which portions of the environments belong to different objects can help to better identify an object, as the accuracy of an object detection process can be improved if knowing that a table on a rug are two separate objects, and being able to accurately determine the respective shape of each. Further, having objects represented separately and independently can enable those objects to be moved, replaced, copied, or otherwise modified.

Figure 2A:
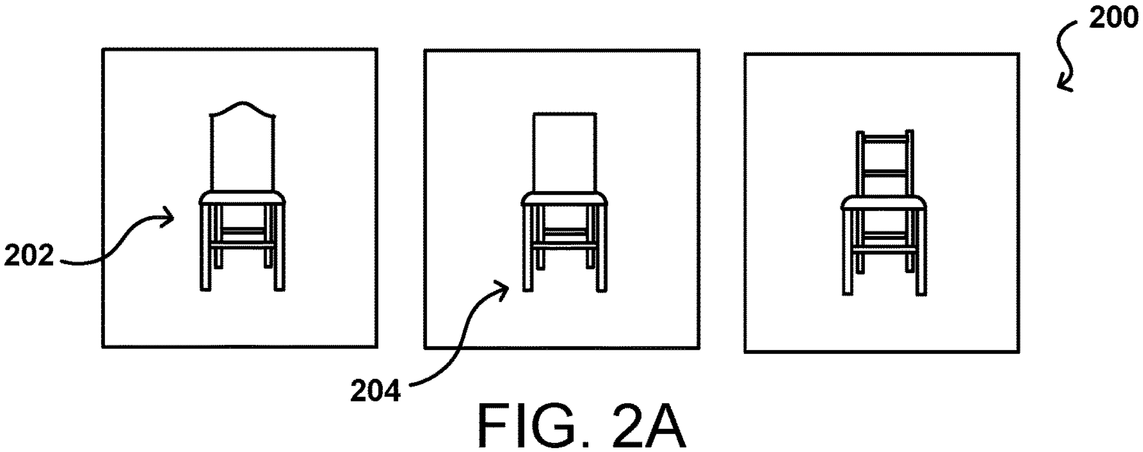
FIGS. 2A, 2B, 2C, and 2D illustrate images of specific objects, as well as images of reconstructed scenes including at least some of those objects, in accordance with various embodiments.

For example, consider the chairs 104 in the image of FIG. 1A, which in this case are all the same type of chair. There may be a catalog or repository of chair data which may include representations 200 of multiple types of chairs, and other such objects, as illustrated in FIG. 2A. These representations may include images, models, meshes, point clouds, feature vectors, embeddings, or other such representations. Once a segmentation or representation of a chair object in the environment is determined or generated, that segmentation can be compared against these stored representations of chairs in order to determine a match, or a known chair type that corresponds to the generated chair segmentation with at least a minimum level of confidence or certainty, or with less than a maximum allowable amount of deviation or error in the match. Using such a process, a specific type of chair 202 can be identified that matches the chairs in the environment. This can be useful information to provide for a user or application, for example, as it can provide information such as pricing, texture, size, materials, and so forth.

Figure 2B:
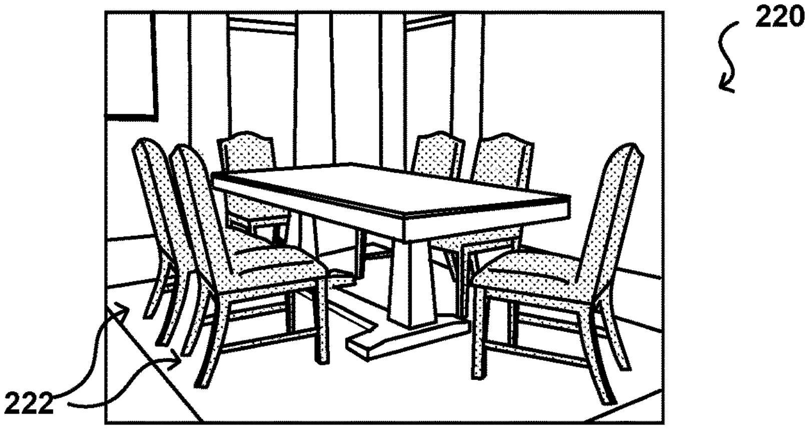

In addition, the information stored for the matching item (in this example chair 202) can be used to improve the virtual representation of the physical environment. In at least one embodiment, this can involve taking the dimension or shape data for the identified object and adjusting the 3D segmentation for the chair based on actual, rather than estimated, shape and dimension information. In some embodiments, there may be a mesh, model, or other representation of that object, such as chair 202, that can be placed into the virtual representation of the environment in place of the estimated, generated, or inferred segmentation. For example, image 220 of FIG. 2B illustrates a situation where the generated segmentations of the chairs have been replaced with 3D representations 222 from an object database, which are accurate representations of those objects that may have been generated and verified for the physical items. Being able to substitute in representations of objects that are known to be accurate can improve the overall quality of the virtual representation of the environment while also greatly improving the efficiency of the process of generating a realistic virtual representation of the environment. In instances where no matching item can be located or an object cannot otherwise be identified or such accurate information is not available, a mesh, model, point cloud or other representation can be generated and used to represent that object, which in at least some embodiments can represent a relatively generic reconstruction of a given segment, such as a generic mesh or point cloud representation of that type, instance, or class of object.

Figure 2C:
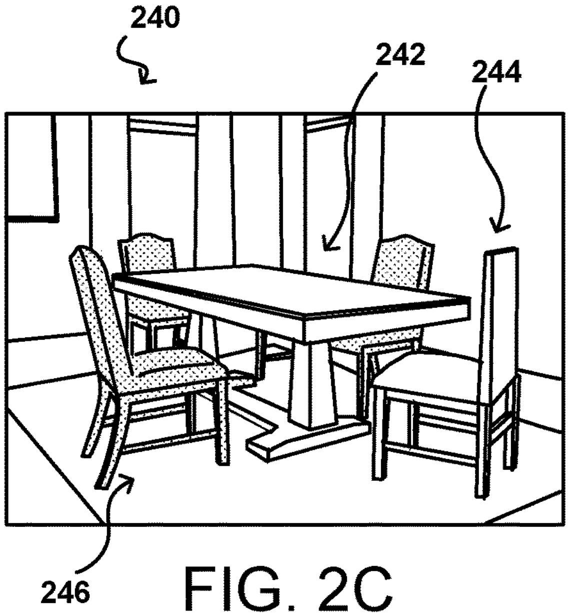
Figure 2D:
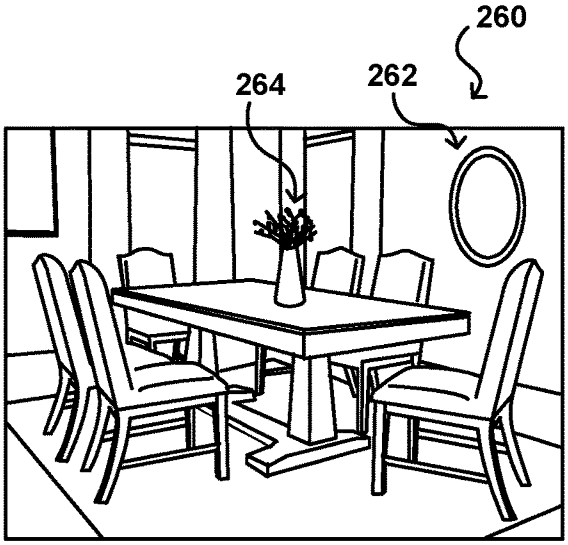

The automated generation of such a virtual representation of an environment, including accurate and individual representations of objects in that environment, can provide for performance of a number of different tasks as mentioned previously. In the case of a design or shopping application, for example, such an environment can enable items to be moved, added, replaced, or otherwise modified, and an updated view of the environment representation provided. For example, in the image 240 of FIG. 2C it can be seen that two of the chairs 242 were removed relative to initial representation 220, and that at least one of the chairs 246 has been slightly repositioned. Because these objects have separate and independent representations, they can be moved around in the virtual 3D environment to see where the items fit or how they might look in different locations. In this example, a user may also have an option to replace one of the representations, such as to select data for a chair 204 in FIG. 2A from a digital catalog and cause a corresponding representation 244 to be placed into a virtual representation of the environment, as illustrated in image 240 of FIG. 2C. A user may also be able to change options for this representation 244, such as to change a color or texture of that representation based upon available options. Such functionality can be useful for design or shopping applications. Such functionality can also be beneficial for purposes such as animation, virtual reality (VR), augmented reality, gaming, simulation, or any other use case where it may be desirable to generate an accurate virtual or digital representation of a physical environment. Being able to remove items from a scene can be beneficial for animation or gaming, for example, where a representation of an environment is to be generated and used, but certain objects were included in the data capture that are not of interest for that usage. A user can also cause representations of objects to be added to a virtual representation of an environment, such as is illustrated in image 260 of FIG. 2D. This can include, for example, virtually hanging a mirror 262 on a wall or placing a vase 264 or centerpiece on a table, where the dimensions of the representations of those objects are accurate for the representation of the environment. Using accurate representations of identified objects from a database also help correct scale and dimensions of various parts of the representation of the environment and the objects contained herein. Such a process can help a user with a design or shopping process, for example, whereby a user can obtain a view of the environment with the addition of specific or potential items of interest, which can be placed in various locations in the environment. Having information about the various items can help these objects to be placed in accurate or realistic locations as well, as may be based upon information such as weight, texture, or material of identified objects. An accurately represented environment can also be useful in simulating the look and behavior of objects within the environment, such as for path, schedule, or task planning for robots or vehicles in a warehouse or factory, or to design scenarios for testing the behavior of an autonomous vehicle sensor, perception, or control stack in a simulated environment. Another scenario in which one or more embodiments of the present disclosure may be useful is in synthetic data generation, in which one or more objects of a virtual environment, or a perspective of the virtual environment may be modified or augmented from a base or reference representation, while largely and otherwise preserving the remaining characteristics of the scene.

Figure 3A:
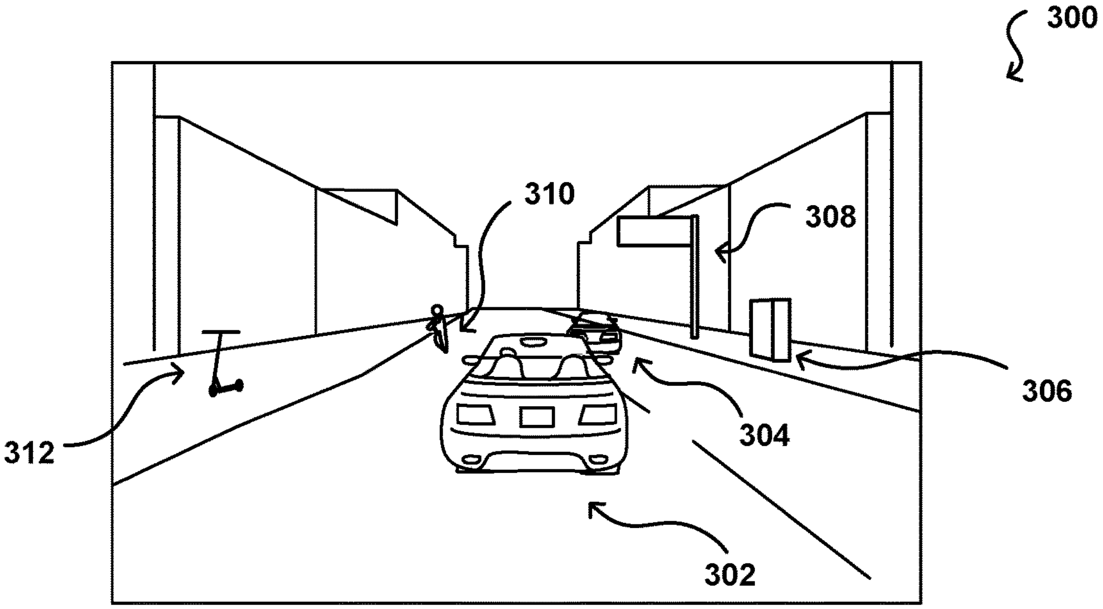
FIGS. 3A and 3B illustrate images of example environments that can be reconstructed, according to at least one embodiment.

For example, FIG. 3A illustrates an example image 300 that can be captured of an environment in accordance with various embodiments. This image might be a video frame of a streaming video capture from a vehicle navigating in an environment such as an urban roadway. This image data (as well as potentially other sensor data such as LIDAR, depth map (RGB-D), video, or radar data) can be analyzed to generate a 3D representation of the environment in which the vehicle is operating. As mentioned, the captured data can be used (along with other potential data such as map or GPS data) to generate an accurate 3D representation that includes individual representations or segmentations objects in the environment. This can include, for example, segmentations for other vehicles 302, 304 nearby, objects such as mailboxes 306 or road signs 308, pedestrians 310, scooters 312, and other such objects. Being able to automatically and accurately segment this environment into individual objects can help a navigation or safety system for that vehicle make better decisions by understanding the types of objects nearby. This can include, for example, determining which objects are likely to be stationary and which objects may move, as well as the ways or rates at which those objects may move. Being able to identify specific types of objects can further improve these decisions. For example, if a specific type of car can be identified then other information can be used to calculate probabilities of various scenarios based upon factors such as rates of acceleration, braking distances, turning radius limits, and other such factors for different vehicles. Further, being able to determine whether a scooter is a motorized or non-motorized scooter can help to make better decisions. In some embodiments, a 3D representation of an environment might be stored in order to require less real-time processing and reduce time for decision making, and being able to determine which objects are likely stationary in that environment and which are likely to change or move over time can help to better understand which objects should be stored for that environment.

Figure 3B:
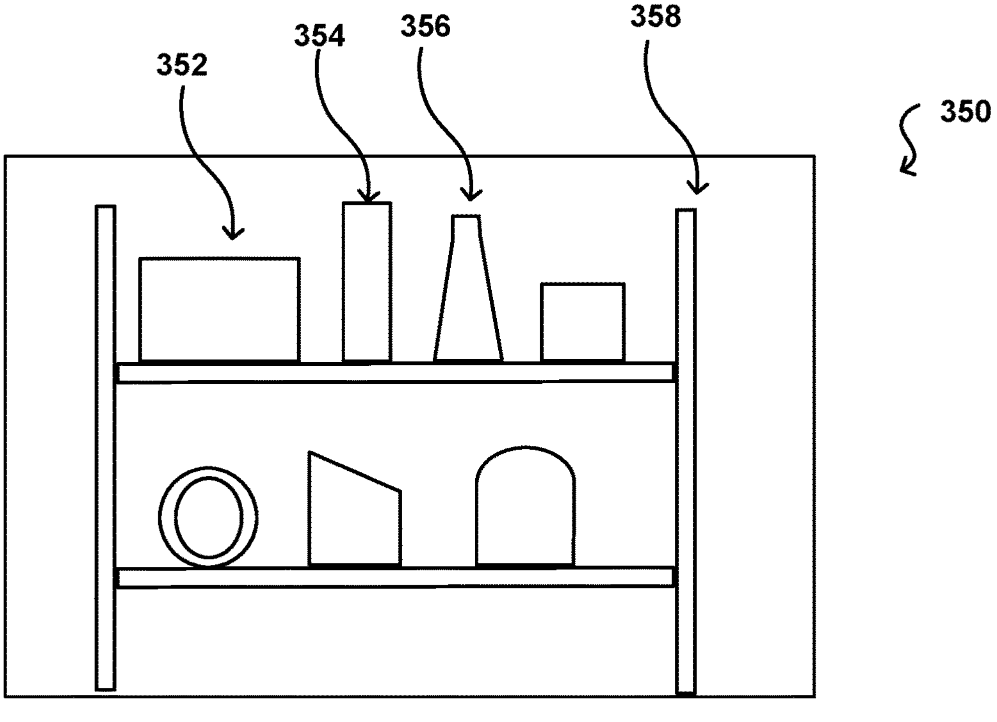

FIG. 3B illustrates an example image 350 of another set of objects in an environment. In this example, the objects may include various items 352, 354, 356 on shelving 358 in a warehouse or stockroom, for example. A virtual representation of this environment can be generated, with individual representations of objects that can be identified. Such a representation can be useful for automated inventory management, to determine which items are in stock, how many of those items are in stock, and where they are located. Such a representation can also be useful in directing a human or robot to locate, retrieve, or interact with those items. For example, a robot might capture video data as it moves through a warehouse. The video can be analyzed in real time to identify individual objects within a view of the robot (or cameras that can provide information to the robot or a robot control system, etc.). If the robot is to retrieve an item from the warehouse, the robot can navigate until that item is located based at least on this environmental representation, and can then determine how to best access or grab the item from the shelf or location based at least on the shape and position of the item. If a human is to retrieve the object, this information can be useful in generating instructions or a guide for the person to be able to locate and interact with the object. In some embodiments, a representation of a person can be added to the scene as well and rendered or animated to demonstrate an interaction with a specific object based, at least in part, upon the information determined for that object. Being able to replace an estimated shape of the object with an actual shape of the object, based on model or other information as discussed herein, can help to make a better determination of interaction with an object based upon actual measurements or shape information, as well as other information such as weight, material, and so on. Various other applications of such functionality would be apparent to one of ordinary skill in the art in light of the teachings and suggestions presented herein. These applications may include, without limitation, scanning construction environments or mines and performing physical measurements, virtual reality (VR) application with improved tracking and extended range, scanning of historical and heritage sites, scanning of human bodies for custom fashion design, and prosthetics and dental scanning or 3D reconstruction of body parts and teeth to custom-fit prostheses.

In at least some embodiments, such an approach can be used for DeepSearch applications as well. As mentioned, one application might utilize environment reconstruction for inventory purposes. In situations where the types of objects in the environment may not be known, such an approach can help search for information about these objects that may help to identify those objects, or otherwise provide information about those objects. This may include, for example, generating representations of individual objects, and then attempting to search for information about those objects based, at least in part, upon those representations. This can include a search in a database, library, or catalog, as well as a search of various sources or repositories across the Internet or another such network. In some embodiments, a user may also be able to use such a process to identify or obtain information about a specific object simply by capturing an image or otherwise scanning that object. For any image or data capture discussed herein, it should be understood that there may be advantages of scanning that environment by capturing data from multiple points of view or directions, such as by moving a camera along a trajectory through the environment, in order to attempt to gain as much image or sensor data as possible for the environment, in order to provide the most accurate representation of the environment and reduce an amount of the representation that may need to be estimated or inferred.

Figure 4:
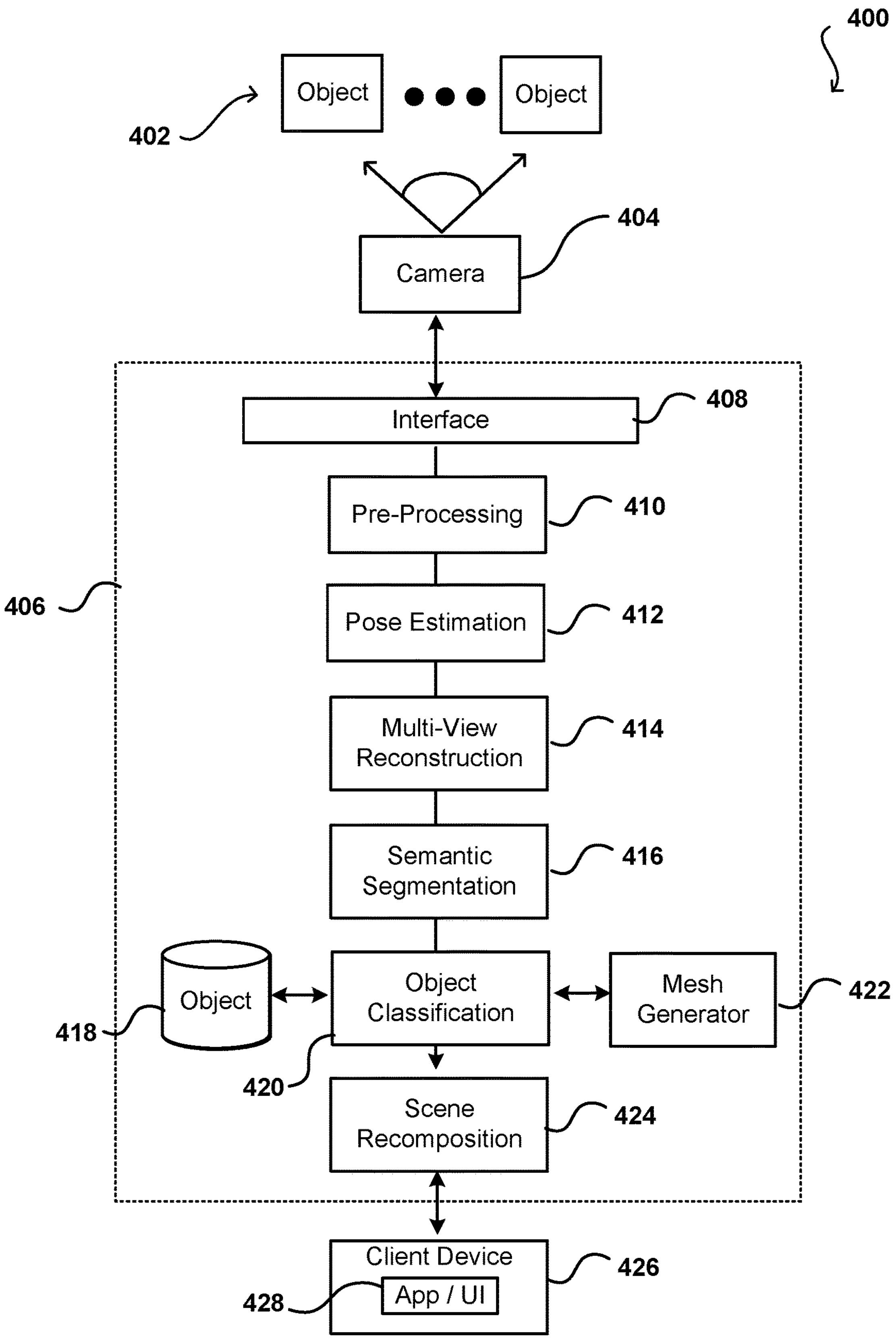
FIG. 4 illustrates an example system for reconstructing an environment including one or more objects, according to at least one embodiment.

FIG. 4 illustrates an example system 400 that can be used to generate such a representation, as well as to allow for at least some modification, reconstruction, or interaction with the representation. Although shown as part of a single system, it should be understood that various components (including those not illustrated in the figure) can be located at different locations or provided by various entities, such as may communicate over one or more wired or wireless networks. In this example, a camera 404 (e.g., a full color RGB, RGB-D (ToF or stereo camera), single channel, infrared (IR), or grayscale camera) can capture image data of one or more objects 402 in an environment that are within a field of view of the camera. More than one camera or image sensor can be used, of the same or different types, to capture different fields or points of view of the environment. As mentioned, other types of sensors or devices can be used to capture data as well, as may include LIDAR, radar, depth sensing, or other such devices. In this example, this data is provided to an environment reconstruction system 406. The data may be received to an interface layer 408, which may include one or more interfaces or addresses for receiving the information, as well as components for directing the information, as may include one or more routers, network switches, load balancers, or other such components. In this example, the data may undergo at least some amount of pre-processing using one or more pre-processing modules 410. This may include, for example, input de-noising, resizing, distortion correction, keypoint extraction, normal map computation, and depth map-to-image registration, among other such possibilities.

In at least one embodiment, a pre-processing module 410 can include one or more single-frame RGB-D processing algorithms that can take as input an RGB-D frame and camera intrinsic parameters. Depth map pre-processing can then be performed, in which an adaptive bilateral filter cam be applied to the depth map in order to de-noise the map while preserving sharp features and discontinuities. A confidence map can be calculated that stores the input depth confidence for each pixel, and the depth map can be back-projected into a per-pixel vertex map that stores the 3D camera-frame position of the point seen in each pixel. A per-pixel normal map can be computed from the vertex map to store the 3D camera-frame normal direction of the point seen in each pixel. A color/normal/vertex map pyramid can be generated by downsampling the original maps in several stages. To perform 3D keypoint extraction for visual tracking, color image data in at least one embodiment can be converted to grayscale and 2D keypoints identified in the grayscale image. Local visual descriptors can be extracted for each keypoint, also from the grayscale image, and the 2D keypoints can be back-projected into 3D keypoints by using the depth. The data may also be passed through at least one filter to reduce noise in the images, whether before, during, or along with other pre-processing of the input data performed using pre-processing module 410. This can be any appropriate filter, such as a linear filter or digital signal processor that may be used with an optimization algorithm to remove noise while retaining fine detail. Other filters can be used as well, such as a blur filter or motion filter.

A pose estimation module 412 can analyze the input scan or image data to attempt to determine a camera position (in 3D space) with respect to the environment for individual frames, images, or instances. This can involve determining a set of keypoints and surface normals, as discussed in more detail later herein, that can be used to register different views of the environment. In this example, determined pose information can be passed to a multi-view surface reconstruction module 414. A multi-view surface reconstruction module can take available information, such as these keypoints, surface normals, and depth information, where available, to project surface points from the input into a 3D representation space. This can include registering frames of a video (e.g., RGB-D or RGB video) by localizing the frames in space to produce a point cloud representation of the environment. This registration can include determining six degrees of freedom pose information relative to an initial frame of this video data. In some embodiments, data from an environment scan may be separated into sections to allow a 3D model to be optimized to compensate for drift. Where depth information is not available, depth may be inferred from the input data and used to estimate the locations of specific points in this 3D representation space. The points from different views can then be fused or otherwise utilized to generate a single, consistent representation of the environment, such as a point cloud or mesh that represents the overall environment, that is consistent from multiple views. In some embodiments, a sparse 3D model can be generated based at least by using these keypoints and normals to register the different views and build a consistent sparse representation of the environment, and then the data from these various views can be used to fill in the sparse model once generated. The sparse model of keypoints may also be retained and used for tracking and registration over time in at least some embodiments.

The initial representation of the environment can be passed to a semantic segmentation module 416. This module may include at least one segmentation algorithm or neural network, for example, that is trained to segment the environment into individual objects, where possible or at least a minimum confidence is satisfied. The network can, for each point or at least a subset of points of the environment representation, perform at least some amount of domain organization, such as to identify whether that point corresponds to an object of a specific class, and in some cases of a specific instance of a particular class. A same or different network, component, or process can also determine at least some semantic information about the determined segmentations, such as a type of class of object, instance of a type of object, or independence of one or more segmentations. In some embodiments, this can include generating additional point or segmentation data that may not have been present in the initial representation of the environment. For example, consider the rug on the floor in FIG. 1A. The top and sides of the rug might have been in an initial point cloud or mesh of the environment, but the bottom of the rug would not necessarily have been represented by points in that initial mesh or representation. Similarly, the portion of the floor under the rug may not have been represented by points in that initial mesh or point cloud. During this semantic segmentation process, the rug and floor can be identified as separate objects, or at least the floor an object independent from the background of the environment, and the points or mesh for the rug and floor filled in or completed in order to provide complete segmentations or representations for each. In this way, complete representations can be generated for individual objects even if only a portion of that object is visible in the captured data. This can occur for any object where at least a portion of the object is obscured or otherwise not reflected in at least a portion of the captured environment data. In some embodiments a single neural network may be used for all semantic segmentation tasks, while in other embodiments there may be separate neural networks trained for specific types of environments, such as one model for a warehouse, one for a home interior, one for an urban traffic setting, and so forth, which may provide for more accurate segmentations in at least those scenarios. In some embodiments, the semantic segmentation module may provide one or more segmentation options with associated confidence scores, which can then be analyzed in more detail to determine which option is more likely to be accurate, such as whether a segmentation is actually a single object or should be two segmentations corresponding to separate objects that may be connected or proximate each other in the environment.

In at least one embodiment, a semantic segmentation module 416 can utilize a Minkowsky Engine to segment the point cloud produced. A semantic segmentor or instance segmentor can be used in various embodiments. In some instances it may be difficult to obtain enough data, classified correctly, to train the point cloud segmentor, so one or more augmentation and clustering techniques may be utilized to improve the results. For example, one or more embeddings can be used to cluster and create semantic classes automatically. Objects can be placed randomly in a scene or with different characteristics (color, size, etc.), and a physics simulator used to enable those objects to evolve to have a more physically-accurate relationship in space.

Once at least some amount of segmentation (semantic or otherwise) has been performed, those segmentations can be analyzed using at least one object classification module 420. In some embodiments, classification may be part of the semantic segmentation module 416, or may work with a separate retrieval module (not shown), among other possible configurations. In this example, the object classification module 420 can include an algorithm or neural network trained to compare object segmentations against data stored in an object database 418 or other such location. This module can find a set of the most suitable 3D models in an existing database of 3D shapes and materials for either all or a subset of objects that were found in either an image or a point cloud by, for example, the semantic segmentation module 416. Data in this object database 418 may include any appropriate representation, shape, or dimension information for an object, such as a mesh, computer aided design (CAD) file, point cloud, or other such representation. The comparison include, for example, an algorithm that compares shape data for 3D segmentations, or a neural network that compares feature vectors or embeddings in a latent space, among other such options. An example retrieval process, such as DeepSearch from NVIDIA Corporation, can be used that can operate on meshes. For each mesh it can generate multiple images from different perspectives, and generate a vector ("embedding") representation in such a way that meshes that are "conceptually" similar also appear relatively close in vector space. These vectors can be stored in a specialized storage, which implements fast approximate and/or exact nearest neighbor search. In order to retrieve the closest object for an input point cloud or image segment, the embedding can be generated using the network from the previous step, and compatible objects identified in the database. The overall architecture of the retrieval system can be designed as a collection of microservices that can be easily scaled to efficiently process and search large object collections Utilizing a latent object space can be beneficial even if an object cannot be classified, as the location in latent space can enable a general identification of a type of object to be made. Such an object space can also enable various assumptions to be made as to the size, shape, and other aspects of that object, which can be used to create a more accurate mesh or representation of that object. In some embodiments, a class of an object that has been segmented can be identified using a hierarchy of classes that can be predefined or automatically computed from a dataset of available object data instances. An object representation may be generated using a mesh generator 422 for objects that are unable to be successfully identified, or for objects that are able to be identified but for which models, point clouds, meshes, or other representations do not already exist in the database and must be created or generated if they are to be included in a representation of an environment. The mesh generator 422 can include any appropriate algorithm, component, network, or process that is able to take data such as point cloud or dimension data and generate a 2D or 3D virtual representation of an object as discussed herein. In at least one embodiment, a meshing and texturing technique can be used without de-lighting, while another embodiment might utilize a NeRF-based implementation from the Kaolin library, which can be extended to reconstruct objects using point cloud data, camera poses, and/or multiple views from an original RGB(-D) scan. A meshing approach might utilize point cloud and normal data to find an implicit surface representation using samples on a recursively subdivided grid, which can be converted to a mesh, and a technique to sample the color of the surface from point cloud and normal data. An example NeRF-based (or similar) implementation can utilize differentiable rendering, where the constructed surface is represented by a neural network, subject to a global optimization.

In other embodiments, the object classification module 420 may return the object that is determined to be closest based on the proximity of its embedding in the latent space. A network, such as a transformer, ResNet for images, or Minokowski Engine for point clouds, may be utilized that can take a point cloud or mesh as input, and can associate embeddings with point cloud segments that were identified by the semantic segmentation module 416. Such a network can be trained using contrastive learning in such a way that the network allows projecting the point cloud segments into an embedding space, which can be shared between images, text, and other such data.

As mentioned, a pre-existing or generated representation of an object, once determined or generated, can be substituted into the representation of the environment in place of an estimated or inferred representation from an initial (or intermediate) representation of the environment. In at least one embodiment, this can be performed by a scene recomposition component 424. In at least one embodiment, this can include one or more algorithms, components, networks, or processes that can take the initial representation of the environment, or data that was used to generate that initial representation, as well as the identified or generated representations of individual objects in that environment, and can generate or reconstruct a virtual or digital representation of the environment or interest, which was represented in the captured image (or other) data. In this example, this virtual representation (or at least a 2D view of this virtual representation) can be provided to a client device 426, or other such device, system, or component, which can enable a view of that virtual representation to be presented to a user or other such entity, such as on one or more display devices receiving content from a content or user interface application 428 executing on this client device 426. It should be understood that for other purposes, such as robot guidance or vehicle navigation, this data may be provided alternatively (or additionally) to a control system or other such component, service, or process, and that a visual presentation may not be performed or required.

In an example where a view of the representation is presented, a user (or other entity) can be provided with an ability, through a graphical user interface (GUI) or other such mechanism, to modify one or more aspects of the virtual environment. As mentioned, this may include moving objects, adding objects, removing objects, modifying objects, and so on. Certain modifications, such as moving or removing objects, may be able to be performed in the application 426 on the client device. Other operations, such as to add or replace specific items, may involve information being fed back to the scene decomposition module 422, which may work with the object classification module 416, mesh generator 420, or other such components to perform the necessary operations. In some embodiments, a user may cause information of an additional object to be captured by the camera 404, or provided from another such source, and this additional information can be processed to generate an updated representation of the environment. This might occur when, for example, a new object is added to, or otherwise newly visible in, the environment. In some embodiments, if an object cannot be identified and cannot have an accurate representation generated, the UI might instruct a user to attempt to scan that object in more detail in order to obtain additional data for the reconstruction. Various other modifications can be made as well as discussed and suggested herein. For situations where image, video, or other information may be continually or periodically updated or captured, such for a vehicle or robot moving through an environment, this representation may be updated or reconstructed accordingly. An advantage of such a system is that this representation can be generated and updated online and in real time, such as while a vehicle or robot is navigating within an environment.

In certain embodiments, there may be different pipelines used for RGB and RGB-D data. For an RGB-D pipeline, an online, incremental SLAM (Simultaneous Localization and Mapping) approach can be used that is designed to reconstruct a static scene or rigid object by using a relatively inexpensive RGB-D scanning device. Such a pipeline can use an RGB-D video stream as input, and reconstruct a dense 3D point cloud and camera trajectory, both built incrementally, such as may be updated at every incoming frame. This can be achieved through visual-geometric tracking of the camera pose, and by fusing depth maps from all video frames into a global 3D point cloud while removing outliers and de-noising the point cloud on-the-fly. Such a pipeline can assume fixed camera intrinsics while scanning (e.g., no zoom changes allowed), and may not utilize any machine learning or deep learning models.

In at least one embodiment, an input adaptor can be used to load sensor data from disk or acquire the raw input from the sensors of a scanning device. The adaptor can generate an RGB-D frame from the raw input by aligning raw color image and the raw depth map pixel-wise, and can remove lens distortions from the image and depth map. The adaptor can also stream frames from the sensing device to the device running the SLAM pipeline. Some amount of pre-processing may be performed, such as may be based upon inputs including an RGB-D frame and camera intrinsic parameters. Some amount of depth map pre-processing can be performed, as may involve applying an adaptive bilateral filter to the depth map in order to de-noise it while preserving sharp features and discontinuities. A confidence map can be calculated that stores the input depth confidence for each pixel. The depth map can be back-projected into a per-pixel vertex map, which can store a 3D camera-frame position of the point seen in each pixel, and a per-pixel normal map can be computed from the vertex map that stores the 3D camera-frame normal direction of the point seen in each pixel. A color/normal/vertex map pyramid can then be generated by downsampling the original maps in several stages, such as where each stage downsamples by a factor of 2. In one or more embodiments, the depth map may no longer be required (and thus can be discarded) after preprocessing. In at least one embodiment, 3D keypoint extraction for visual tracking can be performed by converting the color image to grayscale, detecting 2D keypoints in the grayscale image, extracting local visual descriptors for each keypoint (also from the grayscale image), and back-projecting 2D keypoints into 3D keypoints by using the depth, such as from the vertex map after bilateral filtering, to obtain a list of 3D keypoints with positions in the camera frame. A 3D map can be generated that consists of two parts, including a dense 3D cloud reconstructed from depth maps, which can be used for geometric/depth-map based camera tracking. This can also include a sparse 3D cloud of visual landmarks reconstructed from keypoints, which can be used for visual camera tracking.

In at least one embodiment, dense mapping can be used to create a denoised, fused dense cloud of 3D surface elements ("surfels") from the pixel-wise 3D measurements coming from individual camera positions. Such a process can take as input all 3D surfels (in global space) previously reconstructed that are potentially visible in the current frame, as well as an input frame pyramid from preprocessing and global camera pose for the new input frame. Frame integration can be used to integrate the pixel-wise 3D measurements from the current frame into the existing 3D surfel cloud, which may affect only the part of the scene that the camera is observing. Surfels can be projected that are within the camera frustum and oriented towards the camera into the current camera view, with a list of projected surfels stored for each pixel. A "best" surfel can be determined that each pixel of the depth map should be fused into, as may be based at least in part on color/depth/normal consistency criteria and surfel confidence. The selected surfel can be updated at each pixel, or a new surfel created from the pixel if no surfel is visible in the pixel. A weighted moving average can be used to update the position, normal and color of the surfel (in global space). The confidence of the surfel can be increased with the confidence of the pixel's depth measurement, as may be sampled from the confidence map. In one or more embodiments, additional processing of the surfels may be performed, such as to remove noisy or outlier surfels.

Sparse mapping can be used to build a consistent 3D map of landmarks that can be recognized by their visual appearance in new frames. This can be exploited in visual tracking and in visual re-localization. Such a process can take as input all landmarks (in global space) reconstructed previously that are potentially visible in the current frame, RGB-D keypoints extracted from the new input frame, and global camera pose for the new input frame.

Frame integration can be used to integrate RGB-D keypoints detected in the current frame into the global set of 3D visual landmarks. Landmarks can be transformed or projected to be within the camera frustum in a new view. This can contain landmarks that are not seen in the new frame due to occlusion. A number of in-frustum landmarks can be limited to the most recently created N landmarks, which may be important in order to keep the runtime of the next steps under control. A local visual search can be used, such that for each RGB-D keypoint detected in the new frame, and the in-frustum landmark that is visually the most similar within a small radius (e.g., a few pixels) may be selected. In one or more embodiments, keypoints can be matched to at most one landmark in this example. The selected in-frustum landmark can be updated with the new RGB-D keypoint, or a new landmark created if a keypoint had no similar landmarks nearby. A moving average can be used to update the position of the landmark (in global space). The landmark's confidence can also be increased with each new observation integrated. Landmark cleanup can also be performed, such as to remove non-repeatable landmarks that are not useful for camera localization.

In at least one embodiment, 3D mapping can require the camera pose (3D camera position and orientation in global space) for any new frame to be integrated. The role of camera tracking can be to estimate the camera pose of a new frame under the assumption that successive frames have sufficient overlap. Camera tracking can be performed by registering a new input video frame to a virtual frame generated from the 3D model from a known nearby camera pose. This approach is referred to herein as frame-to-model tracking, and can have lower drift (error accumulation) than frame-to-frame tracking.

A virtual frame can be generated from the 3D map from the last known viewpoint, which can correspond to the pose of the last tracked frame). The virtual frame can have the same format as the (preprocessed) input of a new frame. Such a process may involve frustum culling and projection of surfels (in global space) into the virtual view, along with rasterization of normals/vertices of projected surfels into a vertex/normal buffer. A frame pyramid can be built from the rasterized vertex/normal buffers. The pyramid can be of the same dimensions as an input frame pyramid. Frustum culling and projection of landmarks into the virtual view can be performed, followed by conversion into RGB-D keypoints.

Rasterizing all surfels may impact the efficiency or efficacy of camera tracking due to the inclusion of noisy surfels that did not have enough time to gather confidence during scanning. In contrast, rendering only high-confidence surfels may result in sub-optimal (e.g., empty, sparse, or incomplete) virtual frames when only low confidence surfels are available. The latter can occur at the beginning of a scan (empty virtual frames) or during fast motions (sparsely filled virtual frames). Accordingly, embodiments of the present disclosure include implementations of an adaptive strategy, wherein some (e.g., all) surfels above a threshold confidence level are rasterized along with as many lower confidence surfels (in reverse order of confidence) as necessary to ensure a certain coverage (e.g., 50%) of pixels in the virtual frame as much as possible. The implementation can first find the right threshold in a surfel confidence histogram, then rasterize all surfels with confidence above the threshold into the virtual frame.

In order to use visual landmarks in camera pose estimation, the RGB-D keypoints detected in the new frame can be matched to visual landmarks projected into the virtual view. Matching can be implemented as a visual search: the visual descriptor of every detected keypoint can be compared to that of every landmark observed in the virtual view. Descriptors, such as 256-bit binary visual descriptors, can be used and compared in terms of Hamming distance. Matching can be uni-directional for efficiency, where all keypoints are matched to the landmarks and not vice-versa. Matches with a best-to-second distance ratio above a threshold may be ambiguous and can be removed, which can provide a very strong outlier filter in practice (a.k.a. Lowe-criterion).

Outlier filtering can be performed, such as where keypoint-to-landmark pairs from the matching above may contain outliers that are not consistent with the actual (unknown) camera motion between the virtual view and the new input frame. To find and eliminate remaining outliers under an unknown motion, an algorithm such as a 3-point RANSAC algorithm can be employed. Such an algorithm can repeatedly select three random matches, estimate the motion from each triplet, and find all matches that are consistent with the estimated motion. The algorithm can then pick the candidate motion with the highest number of inliers, and discard outlier matches.

Visual-geometric registration can then be performed, such as may involve calculating the relative pose (3D position and orientation) between each new input frame (source frame) to a virtual frame (target frame). The unknown global pose of the new frame can then be calculated by composing the estimated relative pose with the global pose of the virtual frame. The algorithm can combine geometric and visual cues to optimize the relative pose. For geometric cues, points in the source vertex/normal map can transform close to corresponding points in the target vertex/normal map. For visual cues, RGB-D (3D) keypoints in the source frame can transforms close to visually matched "virtual" RGB-D keypoints (projected landmarks) in the target frame. Such an algorithm may have various other characteristics, such as to be hierarchical in nature by first estimating the relative pose from the vertex/normal maps at the coarsest pyramid level, then proceeding to finer levels by initializing the relative pose at each level from the coarser result. The algorithm can use a small-angle approximation of the relative motion because that may lead to a simple linear least-squares problem. The algorithm can estimate the 3D motion from 3D-3D constraints (as opposed to more complex 2D-3D and 2D-2D alternatives), and can minimize a point-plane distance metric between vertex maps and point-point distance between matched keypoints jointly. If keypoint matches are available (arising from visual cues), joint registration can be used to handle degeneracies of Hierarchical ICP that is based on geometric cues only, e.g., planar geometry, rotationally symmetric geometry.

Visual re-localization can be used to find the global camera pose for a new frame with respect to the 3D model when no prior pose information is known (unlike in camera tracking). This can enable a user to continue scanning an existing model in a new session, or in case the camera tracker loses track. One example implementation can match RGB-D keypoints detected in a new frame to landmarks, and image retrieval can be used to speed up the search. In at least one embodiment, global optimization can be used to eliminate drift (accumulated error) from the estimated camera trajectory and the corresponding 3D model, usually by optimizing multiple camera poses and/or 3D points jointly.

In at least one embodiment, reconstruction may be performed using only RGB-data, such video input data. A user may then only need a camera (e.g., mobile phone) to capture the input data. A sparse model of the object can be built incrementally, such as by using Structure-from-Motion (SfM) on-the-fly as the user moves the camera. A dense 3D point cloud of the object can be reconstructed at a much lower rate using, for example, dense Multi-View Stereo (MVS). Quality may be to be lower compared to RGB-D results as discussed previously. Off-line MVS from even a few tens of high-resolution images may last (tens of) minutes. Lower processing time may be achieved with massive GPU parallelization and with sacrifices in output quality. Reconstruction from video input only can have advantages, in that it can utilized a simpler, cheaper sensor, with higher resolution possible than with RGB-D and a larger depth range (e.g., ability to scan closer and farther objects than RGB-D sensors, although errors are high far away). Such an approach can support more complex algorithms than RGB-D, and can provide higher levels of detail with controlled acquisition and high-resolution input than from RGB-D.

Figure 5:
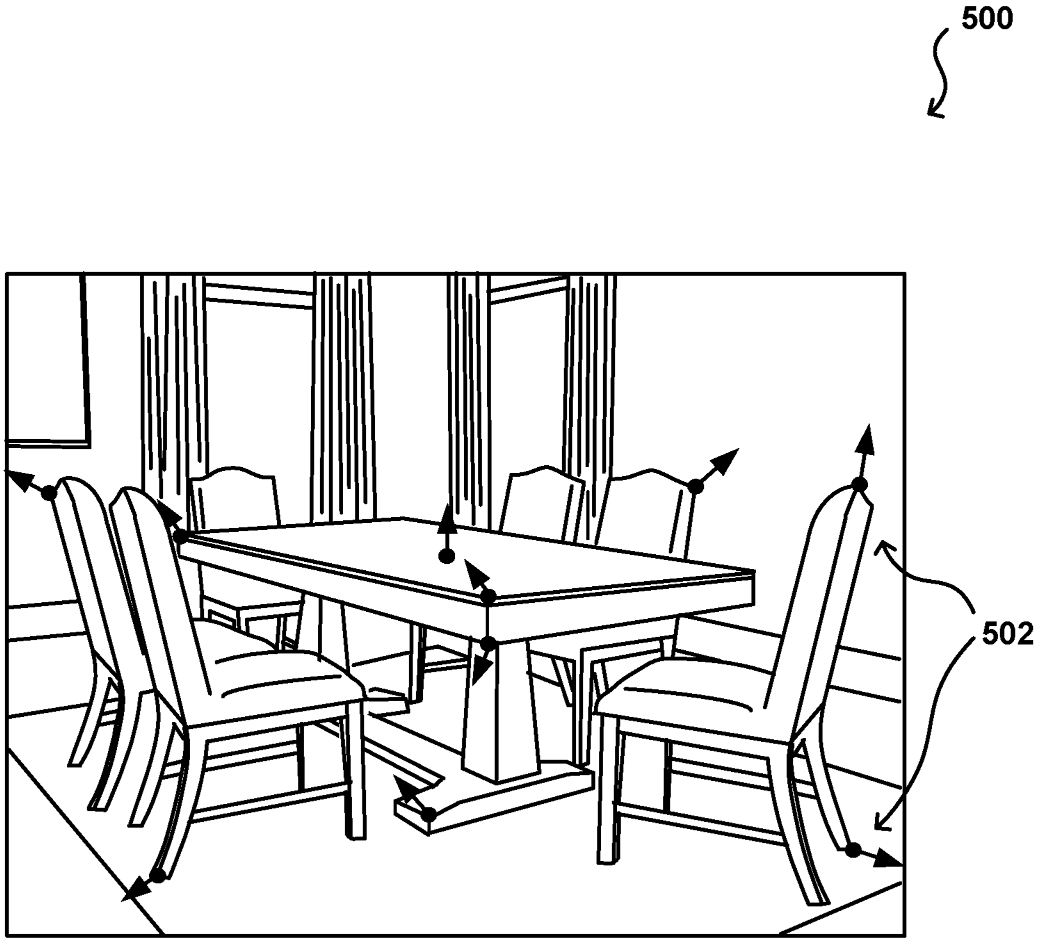
FIG. 5 illustrates example keypoints and normals that can be used to register, determine, and track movement, position, or orientation with respect to a scene, according to at least one embodiment.

In many instances, there will be more than one image or instance of sensor data to be analyzed. This may include, for example, images or video frames captured from different locations or orientations, with different fields of views or resolutions, and may even be captured using multiple devices. In order to generate an accurate representation of the environment that is consistent both spatially and temporally, this data needs to be correlated such that the same features are identified and correlated across these various images, frames, or instances. In at least some embodiments, this can be performed by determining and registering a number of keypoints 502 in each image or representation of the environment, as illustrated in FIG. 5. These keypoints can include any unique or identifying features of the environment that can be useful in registering different instances of the data. These may include, for example, corner, edge, or extrema points, among others, that should be easily identifiable in different views, and that enable those views to be registered together into a single representation. As illustrated in FIG. 5, a visual appearance can be determined for each of these keypoints to assist with registration for data captured from different points of view, and which may represent different subsets of the environment that may have only a limited number of overlapping keypoints. Such keypoints can also be useful in stabilizing camera tracking over time. In some embodiments, these keypoints can be used to register captured data that can be used to generate a representation of the environment. In other embodiments, multiple initial models can be generated based on this different data, and then these keypoints can be used to register, correlate, and refine these separate models into a single, consistent representation.

Such reconstruction approaches can enable a virtual representation of an environment to be generated automatically from only video input data from a single camera, such as a camera from a mobile phone. A sparse model of an object or environment can be built incrementally (e.g., using Structure-from-Motion (SfM)) on-the-fly as the user moves the camera. A dense 3D point cloud of the object can be reconstructed at a much lower rate using, for example, dense Multi-View Stereo (MVS). The quality of a representation generated only from video may be lower in quality in comparison with those generated using data that includes depth information, such as RGB-D, but higher resolution captures may be possible that have a larger depth range and may provide for higher detail with controlled acquisition and high-resolution.

A goal of sparse mapping can be to build a consistent 3D map of landmarks that can be recognized by their visual appearance in new frames. This can be exploited in visual tracking and in visual re-localization, following a similar scheme to dense mapping. The process can receive as input all landmarks (in global space) reconstructed previously that are potentially visible in the current frame, as well as RGB-D keypoints extracted from the new input frame and global camera pose for the new input frame. Frame integration, or landmark fusion, can then be performed which integrates RGB-D keypoints detected in the current frame into the global set of 3D visual landmarks.

An example process can transform/project landmarks that are within the camera frustum into the new view. However, the transformation/projection may contain landmarks that are not seen in the new frame due to one or more occlusions. For each RGB-D keypoint detected in the new frame, the projected landmark can be identified that is visually the most similar within a small radius (e.g., a few pixels). Keypoints in at least some embodiments are matched to at most one landmark. The selected landmark can then be updated with the new RGB-D keypoint, or a new landmark created if a keypoint has no similar landmarks nearby. A moving average can be used to update the position of the landmark in global space. The confidence of the landmark confidence can also be increased with each new observation integrated. Landmark fusion can promote detected RGB-D keypoints to become part of a landmark. This can result in a huge amount of landmarks, including landmarks that have only been observed in a single view and never recognized again. Such non-repeatable landmarks may be of little use. Therefore, in one or more embodiments, landmarks that do not reach a minimum number of observations within a limited number of video frames after their creation may be removed. Such filtering can be robust to occasional misses of a strong keypoint in a subsequent frame, which is likely to be re-detected in two or three frames of not in the next one, but removes keypoints that are detected due to noise and are unlikely to be re-detected in other frames.

In at least some embodiments, texturing can be used to map the redundant set of overlapping input images to underlying mesh triangles. The mesh and the projection parameters of each image can be given from 3D reconstruction. Texturing can involve mesh partitioning, U-V parameterization of the mesh, space-efficient packing, mapping the images into the U-V space via the surface, and assigning contribution weights to images or pixels and blending of the images in U-V space. De-lighting can also be performed to remove the lighting or shadows captured at acquisition time in the texture, and optionally extract radiometric properties of the surface so that the model can be faithfully rendered under any preferred lighting setting. Texturing and de-lighting can be performed with minimal latency, so a user can receive fully photo-realistic feedback on how both the geometry and the radiometric model evolves.

Figure 6:
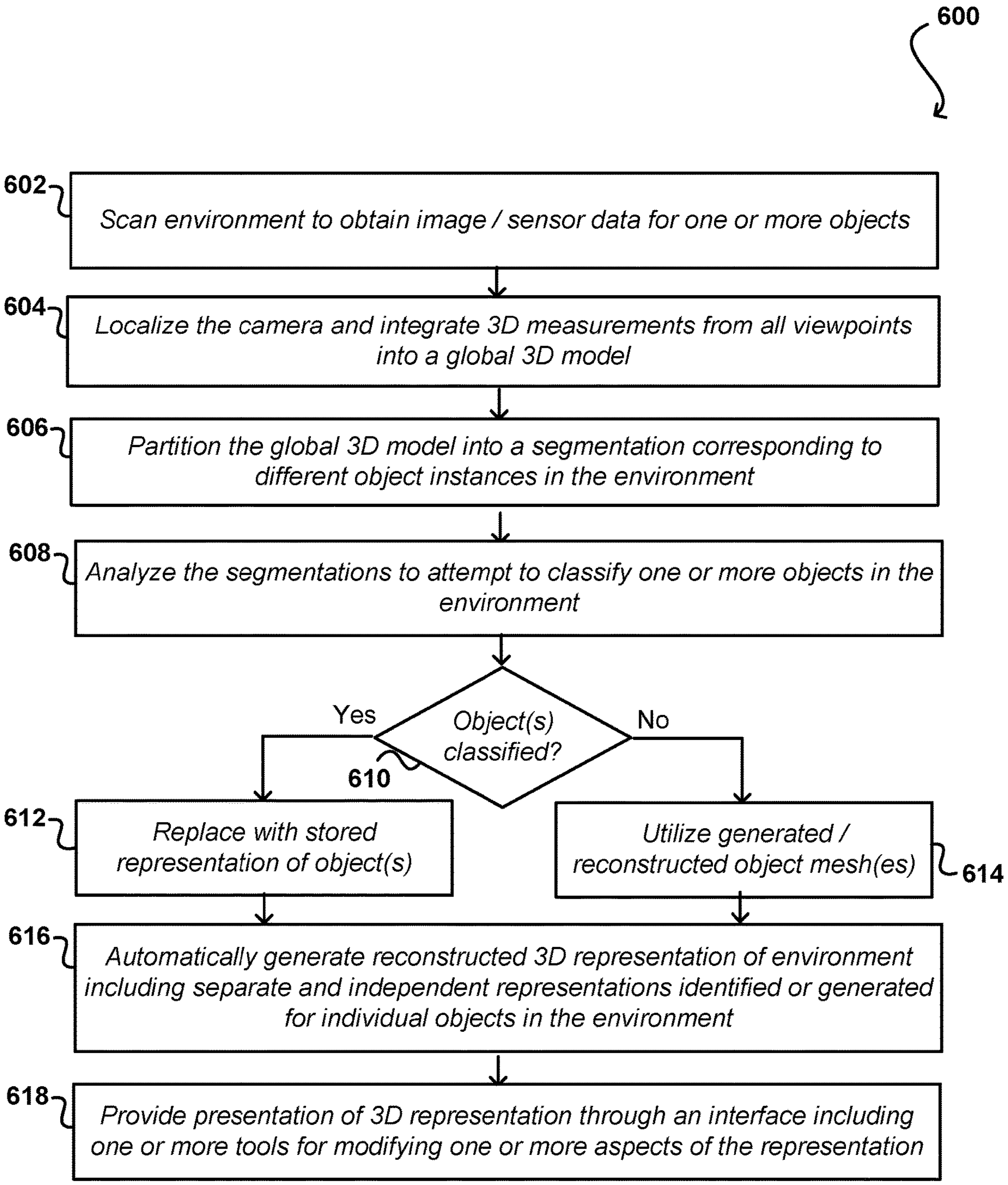
FIG. 6 illustrates an example process for reconstructing an environment, according to at least one embodiment.

FIG. 6 illustrates an example process 600 for automatically generating a digital representation of at least one object, environment, or scene that can be utilized in accordance with various embodiments. It should be understood that for this and other processes discussed herein, there can be additional, fewer, or alternative steps performed in similar or alternative orders, or at least partially in parallel, within the scope of the various embodiments unless otherwise specifically stated. Further, although this process is described as producing the representation for presentation through an interface, it should be understood that advantages of such an accurate digital representation can be obtained for other users or contexts as well, such as is discussed and suggested elsewhere herein. In this example, an environment is scanned 602 using one or more devices to obtain image and/or sensor data for one or more objects. This can include images, video, or other sensor data captured in one or more files, streams, or instances. At least some of this scan data, after any pre-processing, can be used to localize the camera and integrate three-dimensional (3D) measurements from all viewpoints into a global 3D model, such as a 3D point cloud or other initial digital representation, for that environment. This 3D model can be partitioned 606, such as by using a segmentation neural network, into a segmentation, or plurality of segments, corresponding to different objects, or object instances, in the environment. At least some of these segmentations can be analyzed 608 to attempt to identify one or more of these objects in the environment. In some embodiments, this can include generating an embedding or feature vector for these objects and searching for matching or proximate points in an embedding or latent space. If one or more of these objects are able to be classified 610, at least with a minimum confidence, then one or more stored representations of these identified objects can be utilized, such as by replacing 612 a classified object with a stored ideal representation, such as may include an accurate mesh or other graphical representation based upon actual dimensions or shapes of those objects. If it is determined that one or more objects are unable to be accurately classified, or if no stored representation exists for an identified object, then a surface representations, such as a mesh, point cloud, or other free-form representation, can be utilized 614 that was generated or reconstructed for those objects, as may be based at least on the points in the respective representations for those objects, as well as potentially image features in a corresponding portion of the scan data. A reconstructed 3D representation of the environment can then be automatically generated 616 that includes separate and independent representations, as identified or generated, for individual objects in the environment. In this example, a presentation of this 3D representation can then be provided 618 through an interface that includes, provides, or is associated with one or more tools for modifying one or more aspects of this representation. This can include, for example, enabling a user viewing the presentation to modify, replace, move, add, delete, or otherwise provide input with respect to one or more of these or other such objects that are, or are able to be, represented in this environment.

Figure 7:
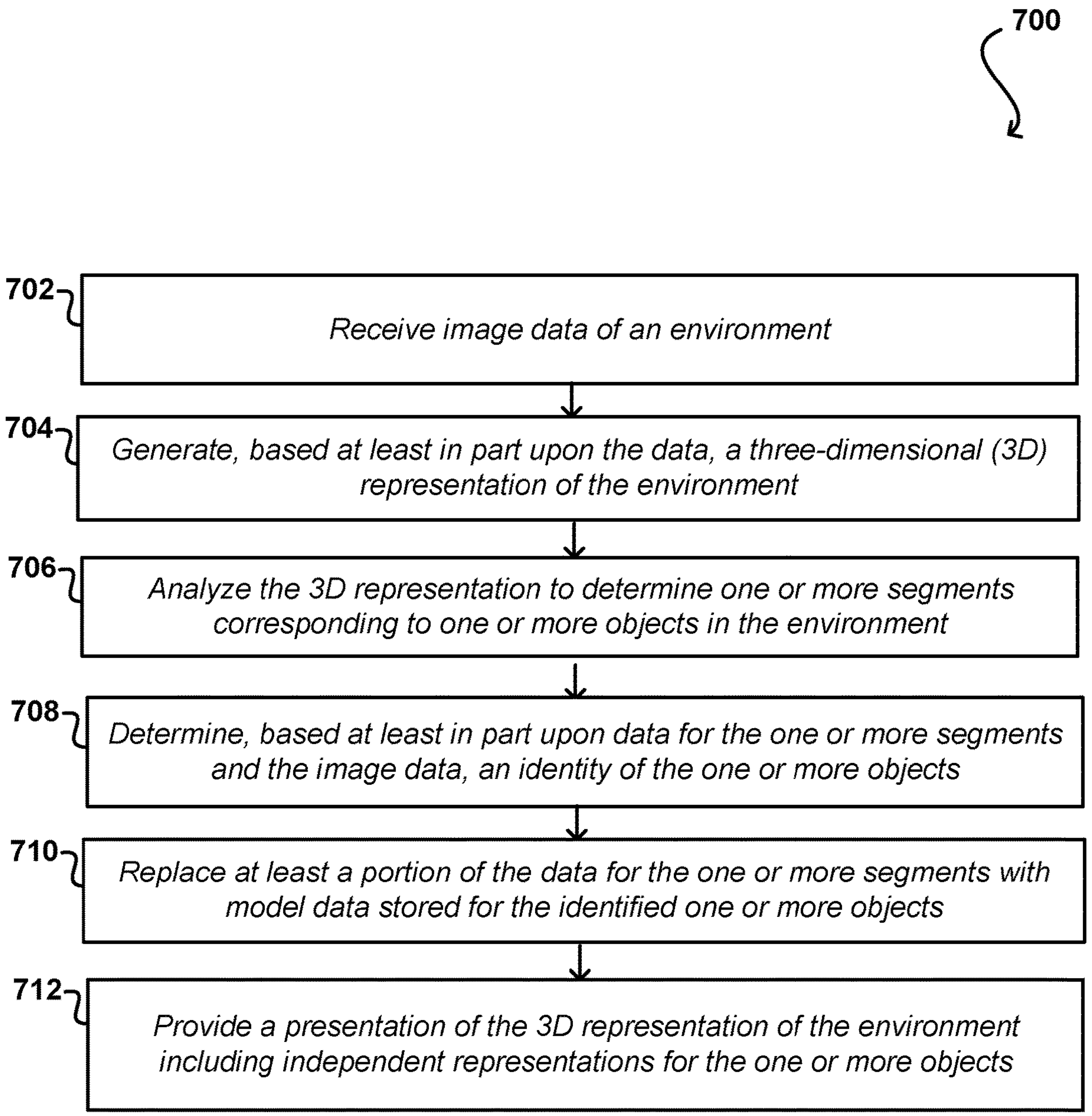
FIG. 7 illustrates an example process for automatically generating a representation of an environment including independent and accurate representations of objects in that environment, according to at least one embodiment.

FIG. 7 illustrates another example process 700 for providing a presentation of a 3D representation that can be utilized in accordance with various embodiments. In this example, image data for an environment is received 702, as may have been captured using one or more devices or provided by one or more sources. This image data may already be registered, or may be registered using a process such as identifying and correlating feature points in the image data. A three-dimensional (3D) representation, such as a mesh or point cloud, can then be generated 704 for the environment based at least on this image data, as well as other data that may be provided with respect to the environment. The 3D representation can be analyzed 706 to determine one or more segments, segmentations, or portions of the 3D representation that correspond to one or more objects in the environment. An identity of these one or more objects can then be determined 708, based at least on the data corresponding to the one or more segments for those objects. Once an identity of these objects is determined, at least a portion of the data for the segments for those identified objects can be replaced 710, supplemented, or modified using data stored for those types of objects, such as meshes or point clouds that are accurate in shape and dimension for the type of object. Such an approach can enable an accurate representation to be used for identified objects rather than estimated representations that are generated from the image data. A presentation of this 3D representation can be provided 712, which includes independent representations that were automatically determined for one or more objects in the environment.

Figure 8:
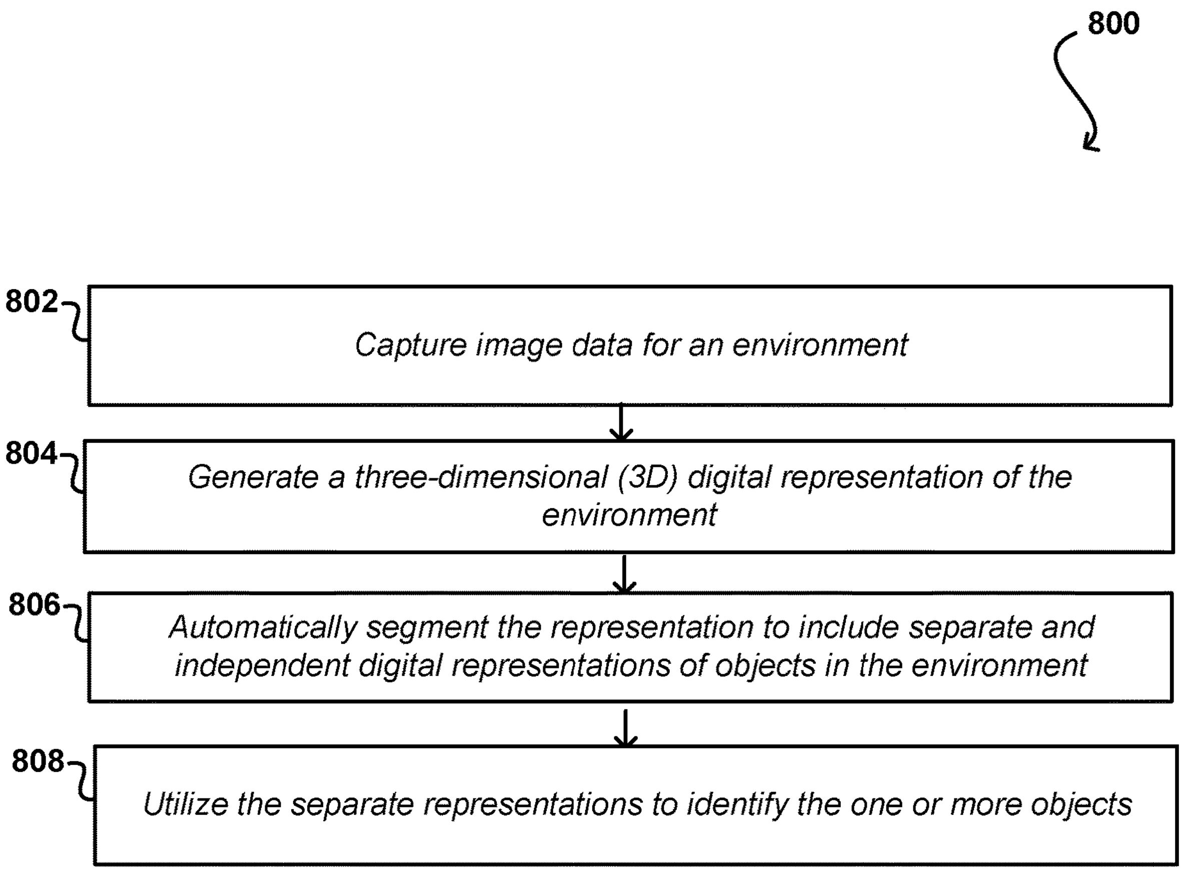
FIG. 8 illustrates an example process for generating a segmented representation of identified objects in an environment, according to at least one embodiment.

FIG. 8 illustrates an example process 800 for automatically generating a representation of an environment that can be utilized in accordance with various embodiments. In this example, image data can be captured 802 for an environment, which may include color and/or depth data, among other such options. From this image data, a three-dimensional (3D) digital representation of the environment can be generated 804. This representation can then be automatically segmented 806 to include separate and independent representations of objects in the environment, such as separate groupings or segmentations of points in an environment point cloud. These separate representations for these objects can then be utilized 808 to identify the one or more objects, such as by generating one or more embeddings based at least on one or more points of these respective segmentations, and then identifying these objects based on locating proximate points in an embedding or latent space. In at least one embodiment, data for these identified objects can then be used to improve an accuracy of the representation, such as by modifying or replacing the representations of the one or more objects in the environment. Data for the generated representation(s) can then be utilized for various purposes, such as those discussed and suggested herein.

As discussed, various approaches presented herein are lightweight enough to execute on a client device, such as a personal computer or gaming console, in real time. Such processing can be performed on content that is generated on that client device or received from an external source, such as streaming content received over at least one network. The source can be any appropriate source, such as a game host, streaming media provider, third party content provider, or other client device, among other such options. In some instances, the processing and/or rendering of this content may be performed by one of these other devices, systems, or entities, then provided to the client device (or another such recipient) for presentation or another such use.

Figure 9:
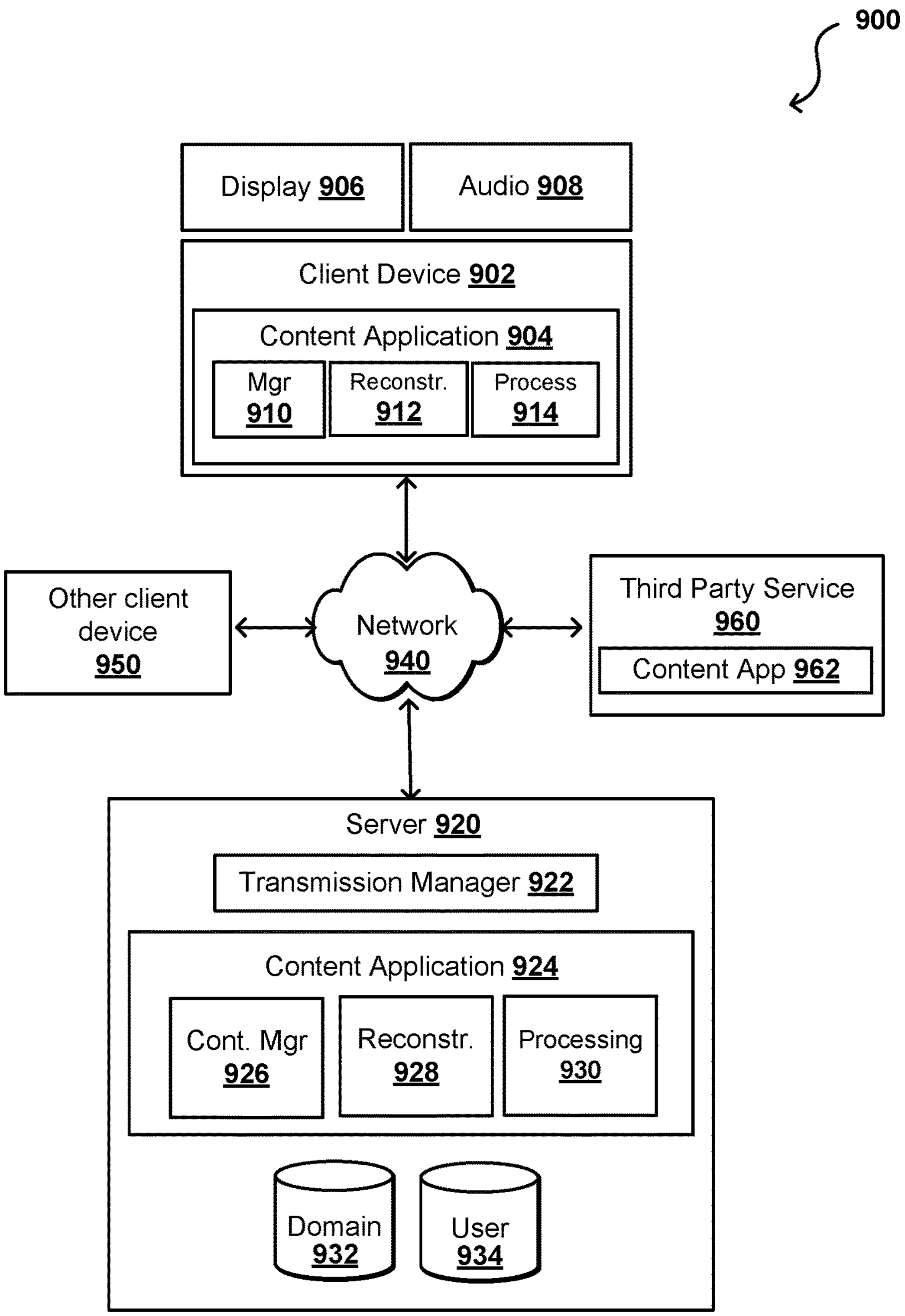
FIG. 9 illustrates components of an example distributed system that can be utilized to determine and/or perform tasks, according to at least one embodiment.

As an example, FIG. 9 illustrates an example network configuration 900 that can be used to provide, generate, modify, encode, and/or transmit content. In at least one embodiment, a client device 902 can generate or receive content for a session using components of a content application 904 on client device 902 and data stored locally on that client device. In at least one embodiment, a content application 924 (e.g., an image generation or editing application) executing on content server 920 (e.g., a cloud server or edge server) may initiate a session associated with at least client device 902, as may utilize a session manager and user data stored in a user database 934, and can cause content 932 to be determined by a content manager 926. A content generation or management application 926 can determine capture or scan data for an image to be generated, which can be passed to a processing component 930 and/or reconstruction component 928, among other such components, modules, or processes, to generate image data, a representation of an object or an environment represented in the scan or image data, which can be transmitted to a client device 902 or other such recipient. At least a portion of that content may be transmitted to client device 902 using an appropriate transmission manager 922 to send by download, streaming, or another such transmission channel. An encoder may be used to encode and/or compress at least some of this data before transmitting to the client device 902. In at least one embodiment, client device 902 receiving such content can provide this content to a corresponding content application 904, which may also or alternatively include a content manager 910, reconstruction component 912, or processing component as presented herein 914. A decoder may also be used to decode data received over the network(s) 940 for presentation via client device 902, such as image or video content through a display 906 and audio, such as sounds and music, through at least one audio playback device 908, such as speakers or headphones. In at least one embodiment, at least some of this content may already be stored on, rendered on, or accessible to client device 902 such that transmission over network 940 is not required for at least that portion of content, such as where that content may have been previously downloaded or stored locally on a hard drive or optical disk. In at least one embodiment, a transmission mechanism such as data streaming can be used to transfer this content from server 920, or user database 934, to client device 902. In at least one embodiment, at least a portion of this content can be obtained or streamed from another source, such as a third party service 960 that may also include a content application 962 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 10A:
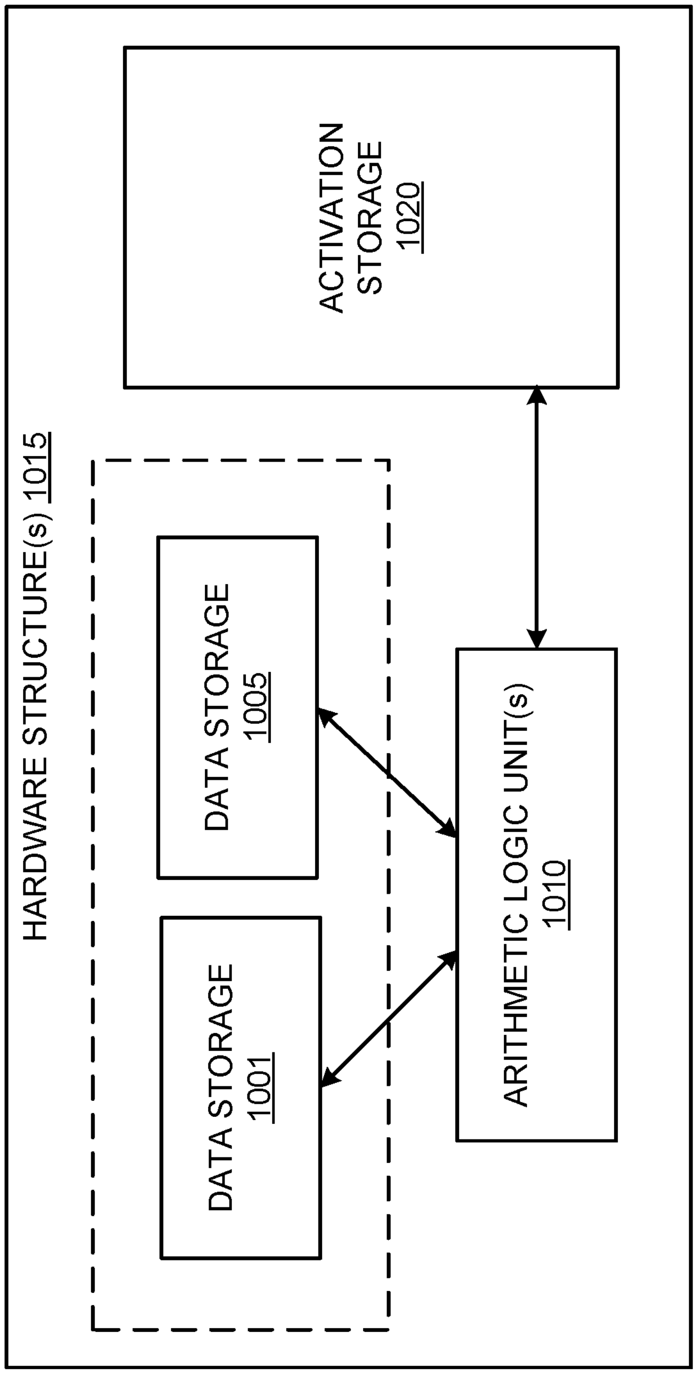
FIG. 10A illustrates inference and/or training logic, according to at least one embodiment.

FIG. 10A illustrates inference and/or training logic 1015 used to perform inferencing and/or training operations associated with one or more embodiments. Details regarding inference and/or training logic 1015 are provided below in conjunction with FIGS. 10A and/or 10B.

In at least one embodiment, inference and/or training logic 1015 may include, without limitation, code and/or data storage 1001 to store forward and/or output weight and/or input/output data, and/or other parameters to configure neurons or layers of a neural network trained and/or used for inferencing in aspects of one or more embodiments. In at least one embodiment, training logic 1015 may include, or be coupled to code and/or data storage 1001 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1001 may be included with other on-chip or off-chip data storage, including a processor's L1, L2, or L3 cache or system memory.

In at least one embodiment, any portion of code and/or data storage 1001 may be internal or external to one or more processors or other hardware logic devices or circuits. In at least one embodiment, code and/or code and/or data storage 1001 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1001 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 may include, without limitation, a code and/or data storage 1005 to store backward and/or output weight and/or input/output data corresponding to neurons or layers of a neural network trained and/or used for inferencing in aspects of one or more embodiments. In at least one embodiment, code and/or data storage 1005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1015 may include, or be coupled to code and/or data storage 1005 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1005 may be included with other on-chip or off-chip data storage, including a processor's L1, L2, or L3 cache or system memory. In at least one embodiment, any portion of code and/or data storage 1005 may be internal or external to on one or more processors or other hardware logic devices or circuits. In at least one embodiment, code and/or data storage 1005 may be cache memory, DRAM, SRAM, non-volatile memory (e.g., Flash memory), or other storage. In at least one embodiment, choice of whether code and/or data storage 1005 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1001 and code and/or data storage 1005 may be separate storage structures. In at least one embodiment, code and/or data storage 1001 and code and/or data storage 1005 may be same storage structure. In at least one embodiment, code and/or data storage 1001 and code and/or data storage 1005 may be partially same storage structure and partially separate storage structures. In at least one embodiment, any portion of code and/or data storage 1001 and code and/or data storage 1005 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1005 and/or code and/or data storage 1001 are used as operands along with other values, such as bias values, gradient information, momentum values, or other parameters or hyperparameters, any or all of which may be stored in code and/or data storage 1005 or code and/or data storage 1001 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. **10*a* may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10***a* may be used in conjunction with central processing unit ("CPU") hardware, graphics processing unit ("GPU") hardware or other hardware, such as field programmable gate arrays ("FPGAs").

Figure 10B:
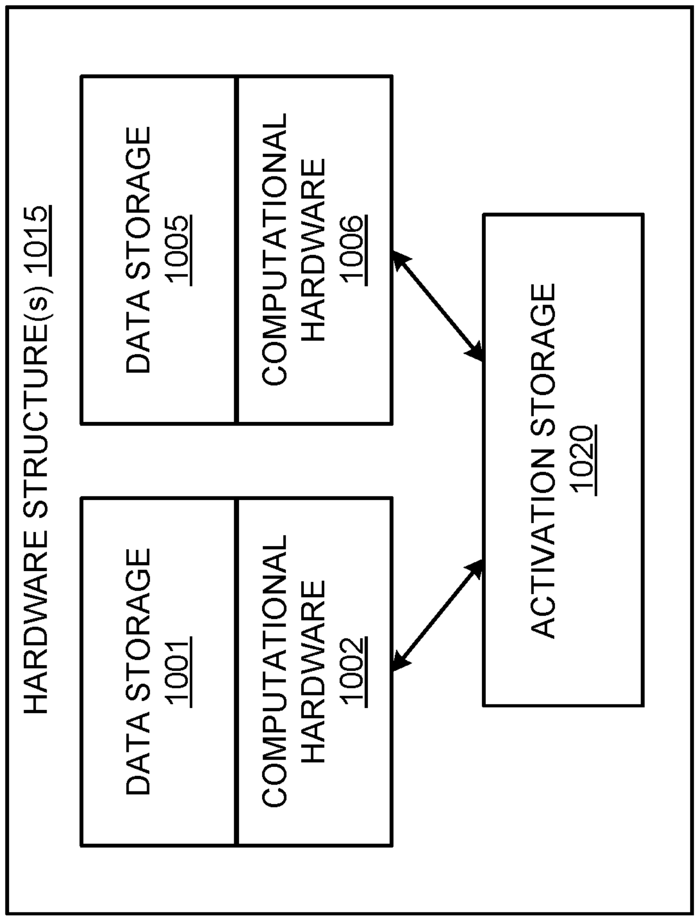
FIG. 10B illustrates inference and/or training logic, according to at least one embodiment.

FIG. 10*b* illustrates inference and/or training logic 1015, according to at least one or more embodiments. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10*b* may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10*b* may be used in conjunction with central processing unit (CPU) hardware, graphics processing unit (GPU) hardware or other hardware, such as field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10*b*, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one "storage/computational pair 1001/1002" of code and/or data storage 1001 and computational hardware 1002 is provided as an input to "storage/computational pair 1005/1006" of code and/or data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Data Center

Figure 11:
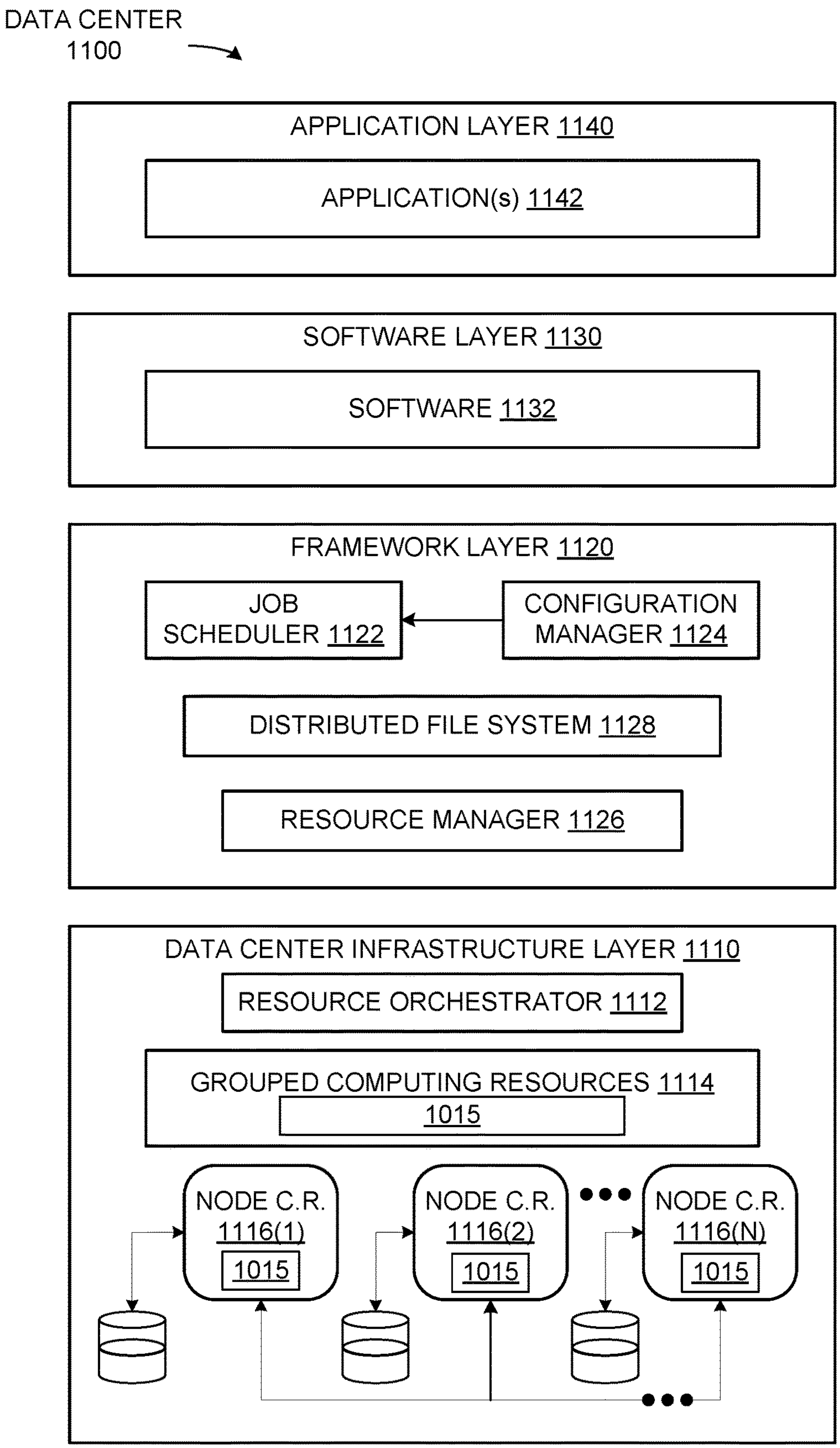
FIG. 11 illustrates an example data center system, according to at least one embodiment.

FIG. 11 illustrates an example data center 1100, in which at least one embodiment may be used. In at least one embodiment, data center 1100 includes a data center infrastructure layer 1110, a framework layer 1120, a software layer 1130, and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resource 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. The one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 11 for inferencing or predicting operations based, at least in part, on weight parameters calculated using neural network training operations, neural network functions and/or architectures, or neural network use cases described herein.

Figure 12:
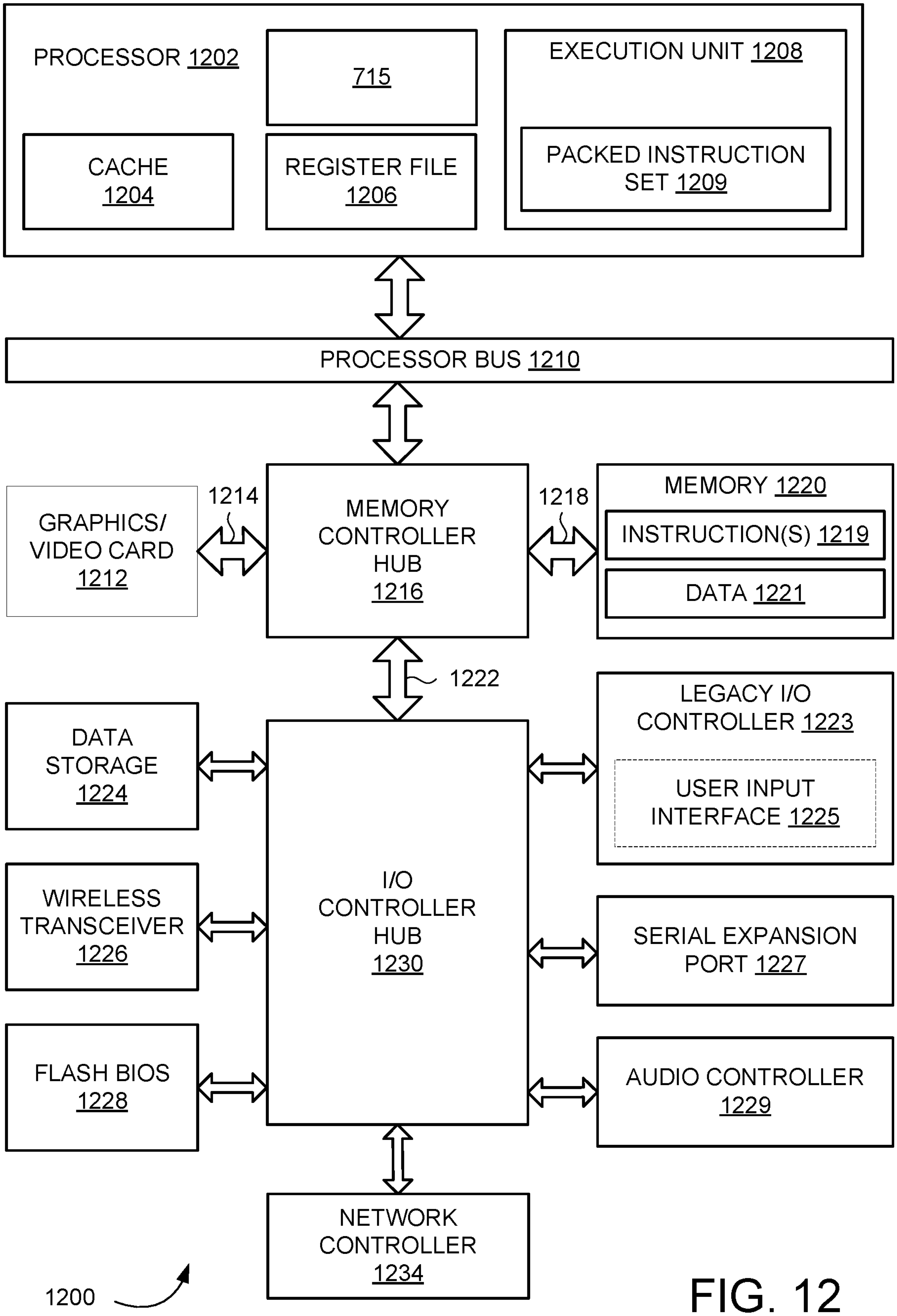
FIG. 12 illustrates a computer system, according to at least one embodiment.

Such components can be used to generate or obtain 3D models for objects classified in input image data Computer Systems FIG. 12 is a block diagram illustrating an exemplary computer system, which may be a system with interconnected devices and components, a system-on-a-chip (SOC) or some combination thereof 1200 formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1200 may include, without limitation, processor 1202 that may include, without limitation, one or more execution units 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interfaces 1225, a serial expansion port 1227, such as Universal Serial Bus ("USB"), and a network controller 1234. Data storage 1224 may comprise a hard disk drive, a floppy disk drive, a CD-ROM device, a flash memory device, or other mass storage device.

In at least one embodiment, FIG. 12 illustrates a system, which includes interconnected hardware devices or "chips", whereas in other embodiments, FIG. 12 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1200 are interconnected using compute express link (CXL) interconnects.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 12 for inferencing or predicting operations based, at least in part, on weight parameters calculated using neural network training operations, neural network functions and/or architectures, or neural network use cases described herein.

Such components can be used to generate or obtain 3D models for objects classified in input image data.

Figure 13:
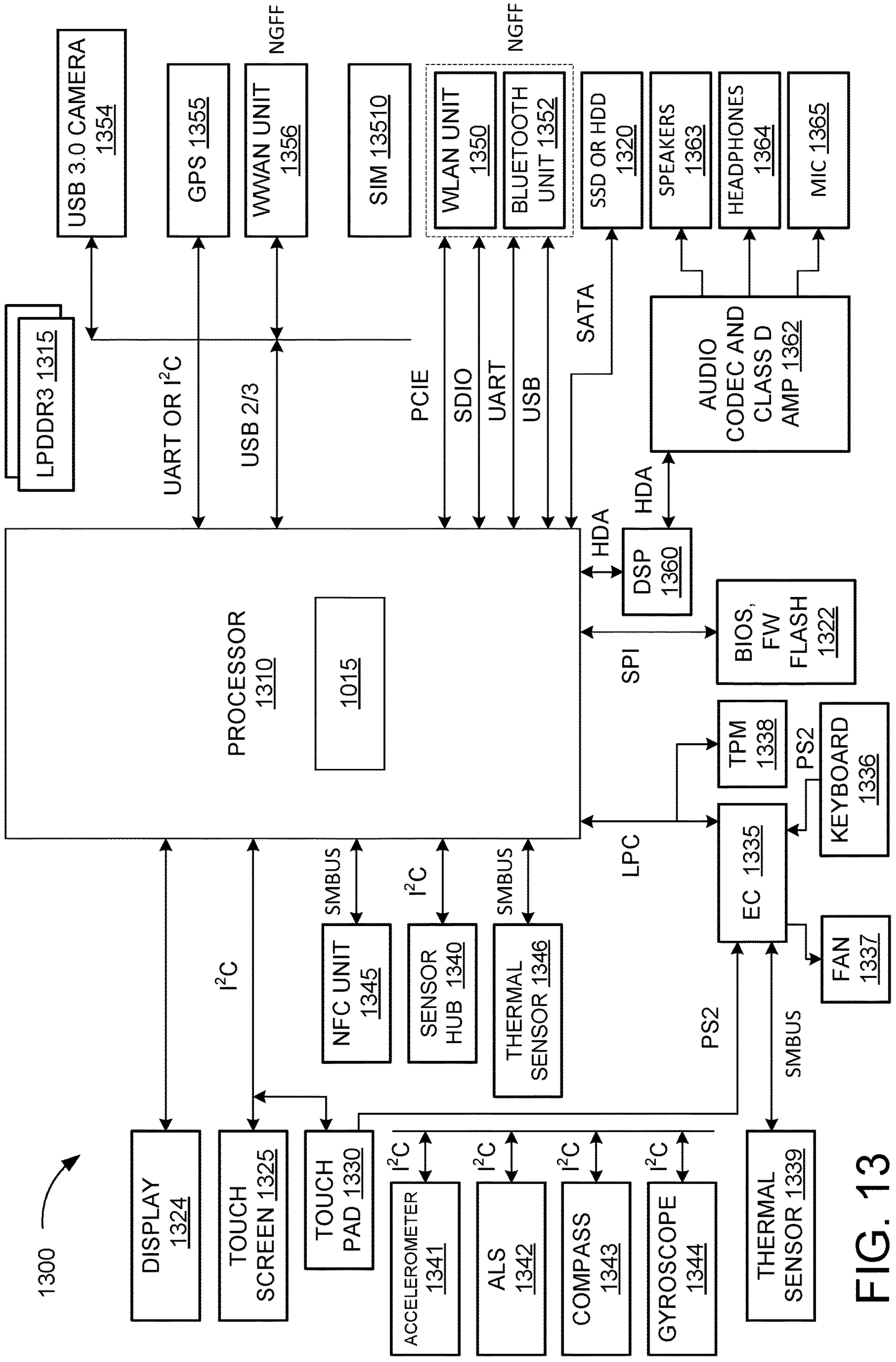
FIG. 13 illustrates a computer system, according to at least one embodiment.

FIG. 13 is a block diagram illustrating an electronic device 1300 for utilizing a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, or any other suitable electronic device.

In at least one embodiment, system 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates a system, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1346, and a touch pad 1330 may be communicatively coupled to EC 1335. In at least one embodiment, speaker 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1364 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Inference and/or training logic 1015 are used to perform inferencing and/or training operations associated with one or more embodiments. Details regarding inference and/or training logic 1015 are provided below in conjunction with FIGS. 10*a* and/or 10*b*. In at least one embodiment, inference and/or training logic 1015 may be used in system FIG. 10 for inferencing or predicting operations based, at least in part, on weight parameters calculated using neural network training operations, neural network functions and/or architectures, or neural network use cases described herein.

Such components can be used to generate or obtain 3D models for objects classified in input image data.

Figure 14:
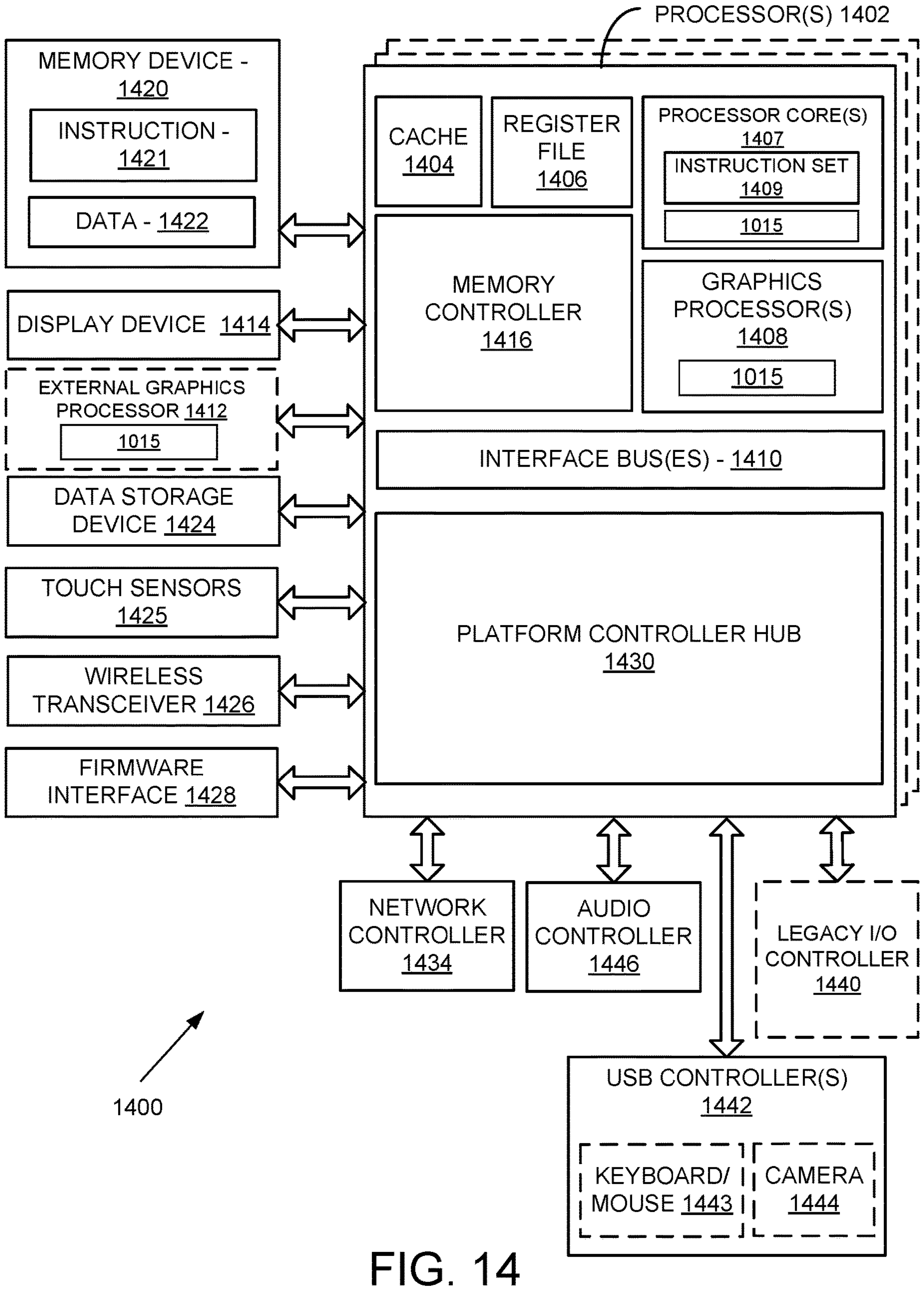
FIG. 14 illustrates at least portions of a graphics processor, according to one or more embodiments.

FIG. 14 is a block diagram of a processing system, according to at least one embodiment. In at least one embodiment, system 1400 includes one or more processors 1402 and one or more graphics processors 1408, and may be a single processor desktop system, a multiprocessor workstation system, or a server system having a large number of processors 1402 or processor cores 1407. In at least one embodiment, system 1400 is a processing platform incorporated within a system-on-a-chip (SoC) integrated circuit for use in mobile, handheld, or embedded devices.

In at least one embodiment, system 1400 can include, or be incorporated within a server-based gaming platform, a game console, including a game and media console, a mobile gaming console, a handheld game console, or an online game console. In at least one embodiment, system 1400 is a mobile phone, smart phone, tablet computing device or mobile Internet device. In at least one embodiment, processing system 1400 can also include, couple with, or be integrated within a wearable device, such as a smart watch wearable device, smart eyewear device, augmented reality device, or virtual reality device. In at least one embodiment, processing system 1400 is a television or set top box device having one or more processors 1402 and a graphical interface generated by one or more graphics processors 1408.

In at least one embodiment, one or more processors 1402 each include one or more processor cores 1407 to process instructions which, when executed, perform operations for system and user software. In at least one embodiment, each of one or more processor cores 1407 is configured to process a specific instruction set 1409. In at least one embodiment, instruction set 1409 may facilitate Complex Instruction Set Computing (CISC), Reduced Instruction Set Computing (RISC), or computing via a Very Long Instruction Word (VLIW). In at least one embodiment, processor cores 1407 may each process a different instruction set 1409, which may include instructions to facilitate emulation of other instruction sets. In at least one embodiment, processor core 1407 may also include other processing devices, such a Digital Signal Processor (DSP).

In at least one embodiment, processor 1402 includes cache memory 1404. In at least one embodiment, processor 1402 can have a single internal cache or multiple levels of internal cache. In at least one embodiment, cache memory is shared among various components of processor 1402. In at least one embodiment, processor 1402 also uses an external cache (e.g., a Level-3 (L3) cache or Last Level Cache (LLC)) (not shown), which may be shared among processor cores 1407 using known cache coherency techniques. In at least one embodiment, register file 1406 is additionally included in processor 1402 which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor 1402 and other components in system 1400. In at least one embodiment, interface bus 1410, in one embodiment, can be a processor bus, such as a version of a Direct Media Interface (DMI) bus. In at least one embodiment, interface 1410 is not limited to a DMI bus, and may include one or more Peripheral Component Interconnect buses (e.g., PCI, PCI Express), memory busses, or other types of interface busses. In at least one embodiment processor(s) 1402 include an integrated memory controller 1416 and a platform controller hub 1430. In at least one embodiment, memory controller 1416 facilitates communication between a memory device and other components of system 1400, while platform controller hub (PCH) 1430 provides connections to I/O devices via a local I/O bus.

In at least one embodiment, memory device 1420 can be a dynamic random access memory (DRAM) device, a static random access memory (SRAM) device, flash memory device, phase-change memory device, or some other memory device having suitable performance to serve as process memory. In at least one embodiment memory device 1420 can operate as system memory for system 1400, to store data 1422 and instructions 1421 for use when one or more processors 1402 executes an application or process. In at least one embodiment, memory controller 1416 also couples with an optional external graphics processor 1412, which may communicate with one or more graphics processors 1408 in processors 1402 to perform graphics and media operations. In at least one embodiment, a display device 1411 can connect to processor(s) 1402. In at least one embodiment display device 1411 can include one or more of an internal display device, as in a mobile electronic device or a laptop device or an external display device attached via a display interface (e.g., DisplayPort, etc.). In at least one embodiment, display device 1411 can include a head mounted display (HMD) such as a stereoscopic display device for use in virtual reality (VR) applications or augmented reality (AR) applications.

In at least one embodiment, platform controller hub 1430 enables peripherals to connect to memory device 1420 and processor 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 can connect via a storage interface (e.g., SATA) or via a peripheral bus, such as a Peripheral Component Interconnect bus (e.g., PCI, PCI Express). In at least one embodiment, touch sensors 1425 can include touch screen sensors, pressure sensors, or fingerprint sensors. In at least one embodiment, wireless transceiver 1426 can be a Wi-Fi transceiver, a Bluetooth transceiver, or a mobile network transceiver such as a 3G, 4G, or Long Term Evolution (LTE) transceiver. In at least one embodiment, firmware interface 1428 enables communication with system firmware, and can be, for example, a unified extensible firmware interface (UEFI). In at least one embodiment, network controller 1434 can enable a network connection to a wired network. In at least one embodiment, a high-performance network controller (not shown) couples with interface bus 1410. In at least one embodiment, audio controller 1446 is a multi-channel high definition audio controller. In at least one embodiment, system 1400 includes an optional legacy I/O controller 1440 for coupling legacy (e.g., Personal System 2 (PS/2)) devices to system. In at least one embodiment, platform controller hub 1430 can also connect to one or more Universal Serial Bus (USB) controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1412. In at least one embodiment, platform controller hub 1430 and/or memory controller 1416 may be external to one or more processor(s) 1402. For example, in at least one embodiment, system 1400 can include an external memory controller 1416 and platform controller hub 1430, which may be configured as a memory controller hub and peripheral controller hub within a system chipset that is in communication with processor(s) 1402.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate or obtain 3D models for objects classified in input image data.

Figure 15:
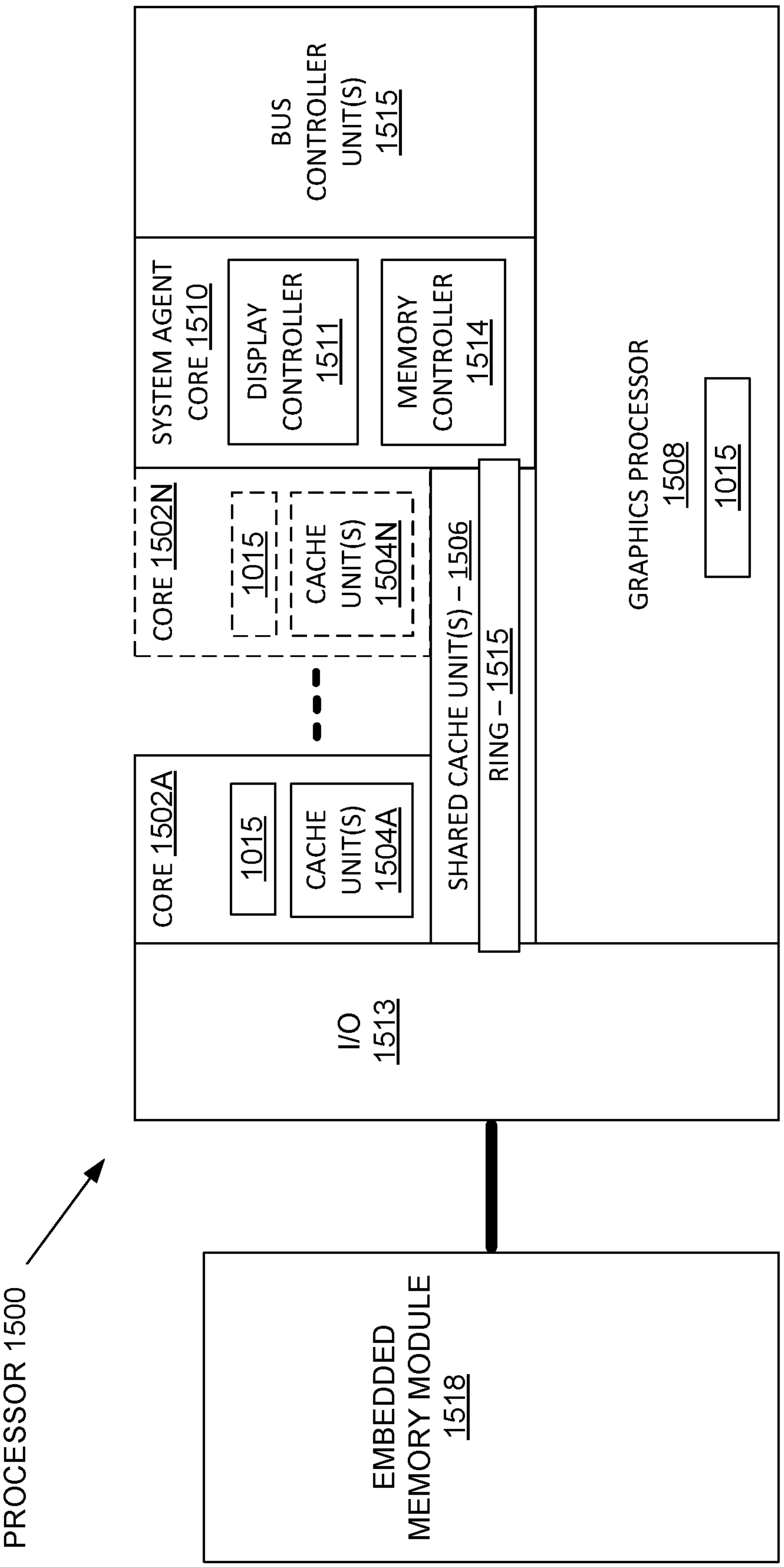
FIG. 15 illustrates at least portions of a graphics processor, according to one or more embodiments.

FIG. 15 is a block diagram of a processor 1500 having one or more processor cores 1502A-1502N, an integrated memory controller 1514, and an integrated graphics processor 1508, according to at least one embodiment. In at least one embodiment, processor 1500 can include additional cores up to and including additional core 1502N represented by dashed lined boxes. In at least one embodiment, each of processor cores 1502A-1502N includes one or more internal cache units 1504A-1504N. In at least one embodiment, each processor core also has access to one or more shared cached units 1506.

In at least one embodiment, internal cache units 1504A-1504N and shared cache units 1506 represent a cache memory hierarchy within processor 1500. In at least one embodiment, cache memory units 1504A-1504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1506 and 1504A-1504N.

In at least one embodiment, processor 1500 may also include a set of one or more bus controller units 1516 and a system agent core 1510. In at least one embodiment, one or more bus controller units 1516 manage a set of peripheral buses, such as one or more PCI or PCI express busses. In at least one embodiment, system agent core 1510 provides management functionality for various processor components. In at least one embodiment, system agent core 1510 includes one or more integrated memory controllers 1514 to manage access to various external memory devices (not shown).

In at least one embodiment, one or more of processor cores 1502A-1502N include support for simultaneous multi-threading. In at least one embodiment, system agent core 1510 includes components for coordinating and operating cores 1502A-1502N during multi-threaded processing. In at least one embodiment, system agent core 1510 may additionally include a power control unit (PCU), which includes logic and components to regulate one or more power states of processor cores 1502A-1502N and graphics processor 1508.

In at least one embodiment, processor 1500 additionally includes graphics processor 1508 to execute graphics processing operations. In at least one embodiment, graphics processor 1508 couples with shared cache units 1506, and system agent core 1510, including one or more integrated memory controllers 1514. In at least one embodiment, system agent core 1510 also includes a display controller 1511 to drive graphics processor output to one or more coupled displays. In at least one embodiment, display controller 1511 may also be a separate module coupled with graphics processor 1508 via at least one interconnect, or may be integrated within graphics processor 1508.

In at least one embodiment, a ring based interconnect unit 1512 is used to couple internal components of processor 1500. In at least one embodiment, an alternative interconnect unit may be used, such as a point-to-point interconnect, a switched interconnect, or other techniques. In at least one embodiment, graphics processor 1508 couples with ring interconnect 1512 via an I/O link 1513.

In at least one embodiment, I/O link 1513 represents at least one of multiple varieties of I/O interconnects, including an on package I/O interconnect which facilitates communication between various processor components and a high-performance embedded memory module 1518, such as an eDRAM module. In at least one embodiment, each of processor cores 1502A-1502N and graphics processor 1508 use embedded memory modules 1518 as a shared Last Level Cache.

In at least one embodiment, processor cores 1502A-1502N are homogenous cores executing a common instruction set architecture. In at least one embodiment, processor cores 1502A-1502N are heterogeneous in terms of instruction set architecture (ISA), where one or more of processor cores 1502A-1502N execute a common instruction set, while one or more other cores of processor cores 1502A-1502N executes a subset of a common instruction set or a different instruction set. In at least one embodiment, processor cores 1502A-1502N are heterogeneous in terms of microarchitecture, where one or more cores having a relatively higher power consumption couple with one or more power cores having a lower power consumption. In at least one embodiment, processor 1500 can be implemented on one or more chips or as an SoC integrated circuit.

Inference and/or training logic 1015 are used to perform inferencing and/or training operations associated with one or more embodiments. Details regarding inference and/or training logic 1015 are provided below in conjunction with FIGS. 10*a* and/or 10*b*. In at least one embodiment portions or all of inference and/or training logic 1015 may be incorporated into processor 1500. For example, in at least one embodiment, training and/or inferencing techniques described herein may use one or more of ALUs embodied in graphics processor 1512, graphics core(s) 1502A-1502N, or other components in FIG. 15. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 1500 to perform one or more machine learning algorithms, neural network architectures, use cases, or training techniques described herein.

Such components can be used to generate or obtain 3D models for objects classified in input image data.

Virtualized Computing Platform

Figure 16:
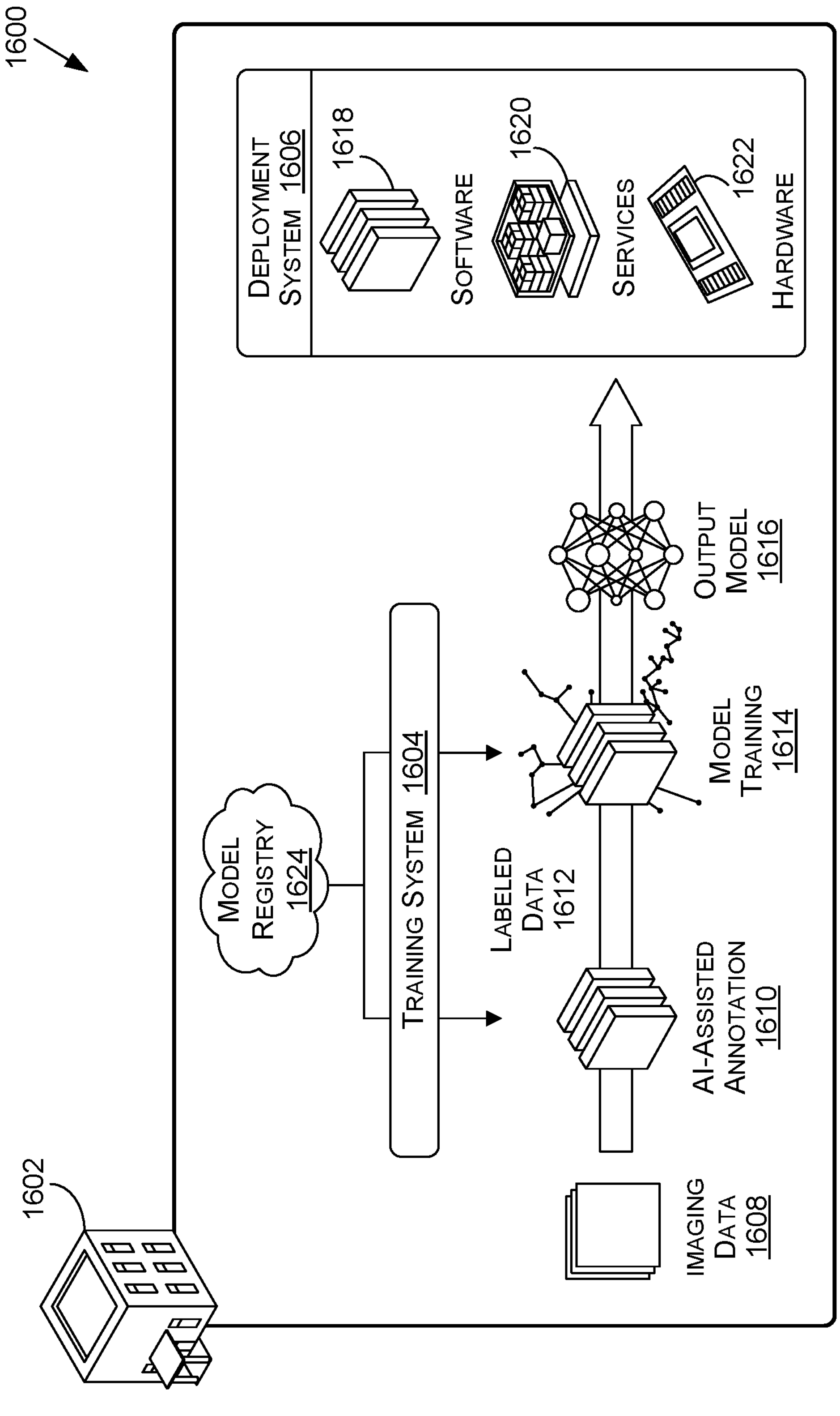
FIG. 16 is an example data flow diagram for an advanced computing pipeline, in accordance with at least one embodiment.

FIG. 16 is an example data flow diagram for a process 1600 of generating and deploying an image processing and inferencing pipeline, in accordance with at least one embodiment. In at least one embodiment, process 1600 may be deployed for use with imaging devices, processing devices, and/or other device types at one or more facilities 1602. Process 1600 may be executed within a training system 1604 and/or a deployment system 1606. In at least one embodiment, training system 1604 may be used to perform training, deployment, and implementation of machine learning models (e.g., neural networks, object detection algorithms, computer vision algorithms, etc.) for use in deployment system 1606. In at least one embodiment, deployment system 1606 may be configured to offload processing and compute resources among a distributed computing environment to reduce infrastructure requirements at facility 1602. In at least one embodiment, one or more applications in a pipeline may use or call upon services (e.g., inference, visualization, compute, AI, etc.) of deployment system 1606 during execution of applications.

In at least one embodiment, some of applications used in advanced processing and inferencing pipelines may use machine learning models or other AI to perform one or more processing steps. In at least one embodiment, machine learning models may be trained at facility 1602 using data 1608 (such as imaging data) generated at facility 1602 (and stored on one or more picture archiving and communication system (PACS) servers at facility 1602), may be trained using imaging or sequencing data 1608 from another facility(ies), or a combination thereof. In at least one embodiment, training system 1604 may be used to provide applications, services, and/or other resources for generating working, deployable machine learning models for deployment system 1606.

In at least one embodiment, model registry 1624 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1624 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1602 is training their own machine learning model, or has an existing machine learning model that needs to be optimized or updated. In at least one embodiment, imaging data 1608 generated by imaging device(s), sequencing devices, and/or other device types may be received. In at least one embodiment, once imaging data 1608 is received, AI-assisted annotation 1610 may be used to aid in generating annotations corresponding to imaging data 1608 to be used as ground truth data for a machine learning model. In at least one embodiment, AI-assisted annotation 1610 may include one or more machine learning models (e.g., convolutional neural networks (CNNs)) that may be trained to generate annotations corresponding to certain types of imaging data 1608 (e.g., from certain devices). In at least one embodiment, AI-assisted annotations 1610 may then be used directly, or may be adjusted or fine-tuned using an annotation tool to generate ground truth data. In at least one embodiment, AI-assisted annotations 1610, labeled clinic data 1612, or a combination thereof may be used as ground truth data for training a machine learning model. In at least one embodiment, a trained machine learning model may be referred to as output model 1616, and may be used by deployment system 1606, as described herein.

In at least one embodiment, training pipeline 1404 (FIG. 14) may include a scenario where facility 1602 needs a machine learning model for use in performing one or more processing tasks for one or more applications in deployment system 1606, but facility 1602 may not currently have such a machine learning model (or may not have a model that is optimized, efficient, or effective for such purposes). In at least one embodiment, an existing machine learning model may be selected from a model registry 1624. In at least one embodiment, model registry 1624 may include machine learning models trained to perform a variety of different inference tasks on imaging data. In at least one embodiment, machine learning models in model registry 1624 may have been trained on imaging data from different facilities than facility 1602 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1624. In at least one embodiment, a machine learning model may then be retrained, or updated, at any number of other facilities, and a retrained or updated model may be made available in model registry 1624. In at least one embodiment, a machine learning model may then be selected from model registry 1624—and referred to as output model 1616—and may be used in deployment system 1606 to perform one or more processing tasks for one or more applications of a deployment system.

In at least one embodiment, training pipeline 1404 (FIG. 14), a scenario may include facility 1602 requiring a machine learning model for use in performing one or more processing tasks for one or more applications in deployment system 1606, but facility 1602 may not currently have such a machine learning model (or may not have a model that is optimized, efficient, or effective for such purposes). In at least one embodiment, a machine learning model selected from model registry 1624 may not be fine-tuned or optimized for imaging data 1608 generated at facility 1602 because of differences in populations, robustness of training data used to train a machine learning model, diversity in anomalies of training data, and/or other issues with training data. In at least one embodiment, AI-assisted annotation 1610 may be used to aid in generating annotations corresponding to imaging data 1608 to be used as ground truth data for retraining or updating a machine learning model. In at least one embodiment, labeled data 1612 may be used as ground truth data for training a machine learning model. In at least one embodiment, retraining or updating a machine learning model may be referred to as model training 1614. In at least one embodiment, model training 1614—e.g., AI-assisted annotations 1610, labeled clinic data 1612, or a combination thereof—may be used as ground truth data for retraining or updating a machine learning model. In at least one embodiment, a trained machine learning model may be referred to as output model 1616, and may be used by deployment system 1606, as described herein.

In at least one embodiment, deployment system 1606 may include software 1618, services 1620, hardware 1622, and/or other components, features, and functionality. In at least one embodiment, deployment system 1606 may include a software "stack," such that software 1618 may be built on top of services 1620 and may use services 1620 to perform some or all of processing tasks, and services 1620 and software 1618 may be built on top of hardware 1622 and use hardware 1622 to execute processing, storage, and/or other compute tasks of deployment system 1606. In at least one embodiment, software 1618 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1608, in addition to containers that receive and configure imaging data for use by each container and/or for use by facility 1602 after processing through a pipeline (e.g., to convert outputs back to a usable data type). In at least one embodiment, a combination of containers within software 1618 (e.g., that make up a pipeline) may be referred to as a virtual instrument (as described in more detail herein), and a virtual instrument may leverage services 1620 and hardware 1622 to execute some or all processing tasks of applications instantiated in containers.

In at least one embodiment, a data processing pipeline may receive input data (e.g., imaging data 1608) in a specific format in response to an inference request (e.g., a request from a user of deployment system 1606). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1616 of training system 1604.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1624 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1620 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1624. In at least one embodiment, a requesting entity—who provides an inference or image processing request—may browse a container registry and/or model registry 1624 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1606 (e.g., a cloud) to perform processing of data processing pipeline. In at least one embodiment, processing by deployment system 1606 may include referencing selected elements (e.g., applications, containers, models, etc.) from a container registry and/or model registry 1624. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1620 may be leveraged. In at least one embodiment, services 1620 may include compute services, artificial intelligence (AI) services, visualization services, and/or other service types. In at least one embodiment, services 1620 may provide functionality that is common to one or more applications in software 1618, so functionality may be abstracted to a service that may be called upon or leveraged by applications. In at least one embodiment, functionality provided by services 1620 may run dynamically and more efficiently, while also scaling well by allowing applications to process data in parallel (e.g., using a parallel computing platform 1430 (FIG. 14)). In at least one embodiment, rather than each application that shares a same functionality offered by a service 1620 being required to have a respective instance of service 1620, service 1620 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1620 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1618 implementing advanced processing and inferencing pipeline that includes segmentation application and anomaly detection application may be streamlined because each application may call upon a same inference service to perform one or more inferencing tasks.

In at least one embodiment, hardware 1622 may include GPUs, CPUs, graphics cards, an AI/deep learning system (e.g., an AI supercomputer, such as NVIDIA's DGX), a cloud platform, or a combination thereof. In at least one embodiment, different types of hardware 1622 may be used to provide efficient, purpose-built support for software 1618 and services 1620 in deployment system 1606. In at least one embodiment, use of GPU processing may be implemented for processing locally (e.g., at facility 1602), within an AI/deep learning system, in a cloud system, and/or in other processing components of deployment system 1606 to improve efficiency, accuracy, and efficacy of image processing and generation. In at least one embodiment, software 1618 and/or services 1620 may be optimized for GPU processing with respect to deep learning, machine learning, and/or high-performance computing, as non-limiting examples. In at least one embodiment, at least some of computing environment of deployment system 1606 and/or training system 1604 may be executed in a datacenter one or more supercomputers or high performance computing systems, with GPU optimized software (e.g., hardware and software combination of NVIDIA's DGX System). In at least one embodiment, hardware 1622 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 17:
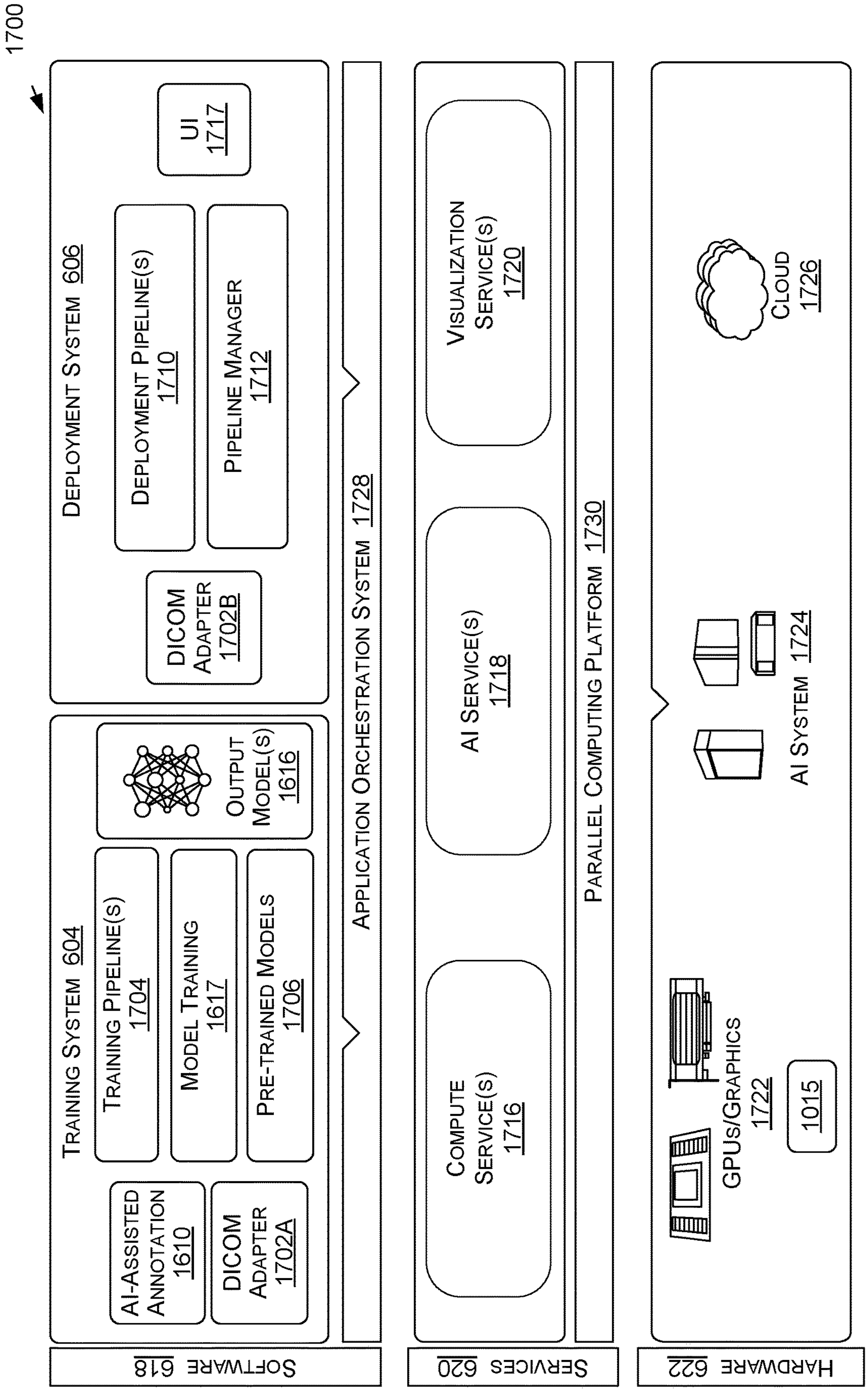
FIG. 17 is a system diagram for an example system for training, adapting, instantiating and deploying machine learning models in an advanced computing pipeline, in accordance with at least one embodiment.

FIG. 17 is a system diagram for an example system 1700 for generating and deploying an imaging deployment pipeline, in accordance with at least one embodiment. In at least one embodiment, system 1700 may be used to implement process 1600 of FIG. 16 and/or other processes including advanced processing and inferencing pipelines. In at least one embodiment, system 1700 may include training system 1604 and deployment system 1606. In at least one embodiment, training system 1604 and deployment system 1606 may be implemented using software 1618, services 1620, and/or hardware 1622, as described herein.

In at least one embodiment, system 1700 (e.g., training system 1604 and/or deployment system 1606) may implemented in a cloud computing environment (e.g., using cloud 1726). In at least one embodiment, system 1700 may be implemented locally with respect to a healthcare services facility, or as a combination of both cloud and local computing resources. In at least one embodiment, access to APIs in cloud 1726 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1700, may be restricted to a set of public IPs that have been vetted or authorized for interaction.

In at least one embodiment, various components of system 1700 may communicate between and among one another using any of a variety of different network types, including but not limited to local area networks (LANs) and/or wide area networks (WANs) via wired and/or wireless communication protocols. In at least one embodiment, communication between facilities and components of system 1700 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1604 may execute training pipelines 1704, similar to those described herein with respect to FIG. 16. In at least one embodiment, where one or more machine learning models are to be used in deployment pipelines 1710 by deployment system 1606, training pipelines 1704 may be used to train or retrain one or more (e.g. pre-trained) models, and/or implement one or more of pre-trained models 1706 (e.g., without a need for retraining or updating). In at least one embodiment, as a result of training pipelines 1704, output model(s) 1616 may be generated. In at least one embodiment, training pipelines 1704 may include any number of processing steps, such as but not limited to imaging data (or other input data) conversion or adaption In at least one embodiment, for different machine learning models used by deployment system 1606, different training pipelines 1704 may be used. In at least one embodiment, training pipeline 1704 similar to a first example described with respect to FIG. 16 may be used for a first machine learning model, training pipeline 1704 similar to a second example described with respect to FIG. 16 may be used for a second machine learning model, and training pipeline 1704 similar to a third example described with respect to FIG. 16 may be used for a third machine learning model. In at least one embodiment, any combination of tasks within training system 1604 may be used depending on what is required for each respective machine learning model. In at least one embodiment, one or more of machine learning models may already be trained and ready for deployment so machine learning models may not undergo any processing by training system 1604, and may be implemented by deployment system 1606.

In at least one embodiment, output model(s) 1616 and/or pre-trained model(s) 1706 may include any types of machine learning models depending on implementation or embodiment. In at least one embodiment, and without limitation, machine learning models used by system 1700 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1704 may include AI-assisted annotation, as described in more detail herein with respect to at least FIG. 15B. In at least one embodiment, labeled data 1612 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1608 (or other data type used by machine learning models), there may be corresponding ground truth data generated by training system 1604. In at least one embodiment, AI-assisted annotation may be performed as part of deployment pipelines 1710; either in addition to, or in lieu of AI-assisted annotation included in training pipelines 1704. In at least one embodiment, system 1700 may include a multi-layer platform that may include a software layer (e.g., software 1618) of diagnostic applications (or other application types) that may perform one or more medical imaging and diagnostic functions. In at least one embodiment, system 1700 may be communicatively coupled to (e.g., via encrypted links) PACS server networks of one or more facilities. In at least one embodiment, system 1700 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1602). In at least one embodiment, applications may then call or execute one or more services 1620 for performing compute, AI, or visualization tasks associated with respective applications, and software 1618 and/or services 1620 may leverage hardware 1622 to perform processing tasks in an effective and efficient manner.

In at least one embodiment, deployment system 1606 may execute deployment pipelines 1710. In at least one embodiment, deployment pipelines 1710 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1710 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1710 depending on information desired from data generated by a device. In at least one embodiment, where detections of anomalies are desired from an MRI machine, there may be a first deployment pipeline 1710, and where image enhancement is desired from output of an MRI machine, there may be a second deployment pipeline 1710.

In at least one embodiment, an image generation application may include a processing task that includes use of a machine learning model. In at least one embodiment, a user may desire to use their own machine learning model, or to select a machine learning model from model registry 1624. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1700—such as services 1620 and hardware 1622—deployment pipelines 1710 may be even more user friendly, provide for easier integration, and produce more accurate, efficient, and timely results.

In at least one embodiment, deployment system 1606 may include a user interface 1714 (e.g., a graphical user interface, a web interface, etc.) that may be used to select applications for inclusion in deployment pipeline(s) 1710, arrange applications, modify or change applications or parameters or constructs thereof, use and interact with deployment pipeline(s) 1710 during set-up and/or deployment, and/or to otherwise interact with deployment system 1606. In at least one embodiment, although not illustrated with respect to training system 1604, user interface 1714 (or a different user interface) may be used for selecting models for use in deployment system 1606, for selecting models for training, or retraining, in training system 1604, and/or for otherwise interacting with training system 1604.

In at least one embodiment, pipeline manager 1712 may be used, in addition to an application orchestration system 1728, to manage interaction between applications or containers of deployment pipeline(s) 1710 and services 1620 and/or hardware 1622. In at least one embodiment, pipeline manager 1712 may be configured to facilitate interactions from application to application, from application to service 1620, and/or from application or service to hardware 1622. In at least one embodiment, although illustrated as included in software 1618, this is not intended to be limiting, and in some examples (e.g., as illustrated in FIG. 12*cc*) pipeline manager 1712 may be included in services 1620. In at least one embodiment, application orchestration system 1728 (e.g., Kubernetes, DOCKER, etc.) may include a container orchestration system that may group applications into containers as logical units for coordination, management, scaling, and deployment. In at least one embodiment, by associating applications from deployment pipeline(s) 1710 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1712 and application orchestration system 1728. In at least one embodiment, so long as an expected input and/or output of each container or application is known by a system (e.g., based on constructs of applications or containers), application orchestration system 1728 and/or pipeline manager 1712 may facilitate communication among and between, and sharing of resources among and between, each of applications or containers. In at least one embodiment, because one or more of applications or containers in deployment pipeline(s) 1710 may share same services and resources, application orchestration system 1728 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1728) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1620 leveraged by and shared by applications or containers in deployment system 1606 may include compute services 1716, AI services 1718, visualization services 1720, and/or other service types. In at least one embodiment, applications may call (e.g., execute) one or more of services 1620 to perform processing operations for an application. In at least one embodiment, compute services 1716 may be leveraged by applications to perform super-computing or other high-performance computing (HPC) tasks. In at least one embodiment, compute service(s) 1716 may be leveraged to perform parallel processing (e.g., using a parallel computing platform 1730) for processing data through one or more of applications and/or one or more tasks of a single application, substantially simultaneously. In at least one embodiment, parallel computing platform 1730 (e.g., NVIDIA's CUDA) may enable general purpose computing on GPUs (GPGPU) (e.g., GPUs 1722). In at least one embodiment, a software layer of parallel computing platform 1730 may provide access to virtual instruction sets and parallel computational elements of GPUs, for execution of compute kernels. In at least one embodiment, parallel computing platform 1730 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1730 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1718 may be leveraged to perform inferencing services for executing machine learning model(s) associated with applications (e.g., tasked with performing one or more processing tasks of an application). In at least one embodiment, AI services 1718 may leverage AI system 1724 to execute machine learning model(s) (e.g., neural networks, such as CNNs) for segmentation, reconstruction, object detection, feature detection, classification, and/or other inferencing tasks. In at least one embodiment, applications of deployment pipeline(s) 1710 may use one or more of output models 1616 from training system 1604 and/or other models of applications to perform inference on imaging data. In at least one embodiment, two or more examples of inferencing using application orchestration system 1728 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1728 may distribute resources (e.g., services 1620 and/or hardware 1622) based on priority paths for different inferencing tasks of AI services 1718.

In at least one embodiment, shared storage may be mounted to AI services 1718 within system 1700. In at least one embodiment, shared storage may operate as a cache (or other storage device type) and may be used to process inference requests from applications. In at least one embodiment, when an inference request is submitted, a request may be received by a set of API instances of deployment system 1606, and one or more instances may be selected (e.g., for best fit, for load balancing, etc.) to process a request. In at least one embodiment, to process a request, a request may be entered into a database, a machine learning model may be located from model registry 1624 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1712) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1620 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1726, and an inference service may perform inferencing on a GPU.

In at least one embodiment, visualization services 1720 may be leveraged to generate visualizations for viewing outputs of applications and/or deployment pipeline(s) 1710. In at least one embodiment, GPUs 1722 may be leveraged by visualization services 1720 to generate visualizations. In at least one embodiment, rendering effects, such as ray-tracing, may be implemented by visualization services 1720 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1720 may include an internal visualizer, cinematics, and/or other rendering or image processing capabilities or functionality (e.g., ray tracing, rasterization, internal optics, etc.).

In at least one embodiment, hardware 1622 may include GPUs 1722, AI system 1724, cloud 1726, and/or any other hardware used for executing training system 1604 and/or deployment system 1606. In at least one embodiment, GPUs 1722 (e.g., NVIDIA's TESLA and/or QUADRO GPUs) may include any number of GPUs that may be used for executing processing tasks of compute services 1716, AI services 1718, visualization services 1720, other services, and/or any of features or functionality of software 1618. For example, with respect to AI services 1718, GPUs 1722 may be used to perform pre-processing on imaging data (or other data types used by machine learning models), post-processing on outputs of machine learning models, and/or to perform inferencing (e.g., to execute machine learning models). In at least one embodiment, cloud 1726, AI system 1724, and/or other components of system 1700 may use GPUs 1722. In at least one embodiment, cloud 1726 may include a GPU-optimized platform for deep learning tasks. In at least one embodiment, AI system 1724 may use GPUs, and cloud 1726—or at least a portion tasked with deep learning or inferencing—may be executed using one or more AI systems 1724. As such, although hardware 1622 is illustrated as discrete components, this is not intended to be limiting, and any components of hardware 1622 may be combined with, or leveraged by, any other components of hardware 1622.

In at least one embodiment, AI system 1724 may include a purpose-built computing system (e.g., a super-computer or an HPC) configured for inferencing, deep learning, machine learning, and/or other artificial intelligence tasks. In at least one embodiment, AI system 1724 (e.g., NVIDIA's DGX) may include GPU-optimized software (e.g., a software stack) that may be executed using a plurality of GPUs 1722, in addition to CPUs, RAM, storage, and/or other components, features, or functionality. In at least one embodiment, one or more AI systems 1724 may be implemented in cloud 1726 (e.g., in a data center) for performing some or all of AI-based processing tasks of system 1700.

In at least one embodiment, cloud 1726 may include a GPU-accelerated infrastructure (e.g., NVIDIA's NGC) that may provide a GPU-optimized platform for executing processing tasks of system 1700. In at least one embodiment, cloud 1726 may include an AI system(s) 1724 for performing one or more of AI-based tasks of system 1700 (e.g., as a hardware abstraction and scaling platform). In at least one embodiment, cloud 1726 may integrate with application orchestration system 1728 leveraging multiple GPUs to enable seamless scaling and load balancing between and among applications and services 1620. In at least one embodiment, cloud 1726 may tasked with executing at least some of services 1620 of system 1700, including compute services 1716, AI services 1718, and/or visualization services 1720, as described herein. In at least one embodiment, cloud 1726 may perform small and large batch inference (e.g., executing NVIDIA's TENSOR RT), provide an accelerated parallel computing API and platform 1730 (e.g., NVIDIA's CUDA), execute application orchestration system 1728 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1700.

FIG. 15A illustrates a data flow diagram for a process 1500 to train, retrain, or update a machine learning model, in accordance with at least one embodiment. In at least one embodiment, process 1500 may be executed using, as a non-limiting example, system 1700 of FIG. 17. In at least one embodiment, process 1500 may leverage services 1620 and/or hardware 1622 of system 1700, as described herein. In at least one embodiment, refined models 1512 generated by process 1500 may be executed by deployment system 1606 for one or more containerized applications in deployment pipelines 1710.

In at least one embodiment, model training 1614 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1614 may not take as long or require as much processing as training a model from scratch. In at least one embodiment, during model training 1614, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1608 of FIG. 16).

In at least one embodiment, pre-trained models 1706 may be stored in a data store, or registry (e.g., model registry 1624 of FIG. 16). In at least one embodiment, pre-trained models 1706 may have been trained, at least in part, at one or more facilities other than a facility executing process 1500. In at least one embodiment, to protect privacy and rights of patients, subjects, or clients of different facilities, pre-trained models 1706 may have been trained, on-premise, using customer or patient data generated on-premise. In at least one embodiment, pre-trained models 1706 may be trained using cloud 1726 and/or other hardware 1622, but confidential, privacy protected patient data may not be transferred to, used by, or accessible to any components of cloud 1726 (or other off premise hardware). In at least one embodiment, where a pre-trained model 1706 is trained at using patient data from more than one facility, pre-trained model 1706 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1706 on-premise and/or off premise, such as in a datacenter or other cloud computing infrastructure.

In at least one embodiment, when selecting applications for use in deployment pipelines 1710, a user may also select machine learning models to be used for specific applications. In at least one embodiment, a user may not have a model for use, so a user may select a pre-trained model 1706 to use with an application. In at least one embodiment, pre-trained model 1706 may not be optimized for generating accurate results on customer dataset 1506 of a facility of a user (e.g., based on patient diversity, demographics, types of medical imaging devices used, etc.). In at least one embodiment, prior to deploying pre-trained model 1706 into deployment pipeline 1710 for use with an application(s), pre-trained model 1706 may be updated, retrained, and/or fine-tuned for use at a respective facility.

In at least one embodiment, a user may select pre-trained model 1706 that is to be updated, retrained, and/or fine-tuned, and pre-trained model 1706 may be referred to as initial model 1504 for training system 1604 within process 1500. In at least one embodiment, customer dataset 1506 (e.g., imaging data, genomics data, sequencing data, or other data types generated by devices at a facility) may be used to perform model training 1614 (which may include, without limitation, transfer learning) on initial model 1504 to generate refined model 1512. In at least one embodiment, ground truth data corresponding to customer dataset 1506 may be generated by training system 1604. In at least one embodiment, ground truth data may be generated, at least in part, by clinicians, scientists, doctors, practitioners, at a facility (e.g., as labeled clinic data 1612 of FIG. 16).

In at least one embodiment, AI-assisted annotation 1610 may be used in some examples to generate ground truth data. In at least one embodiment, AI-assisted annotation 1610 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1614 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1710 at a facility for performing one or more processing tasks with respect to medical imaging data.

In at least one embodiment, refined model 1512 may be uploaded to pre-trained models 1706 in model registry 1624 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1610, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1704. In at least one embodiment, pre-installed annotation tools may be improved over time as new labeled clinic data 1612 is added.

Such components can be used to generate or obtain 3D models for objects classified in input image data.

Figure 18A:
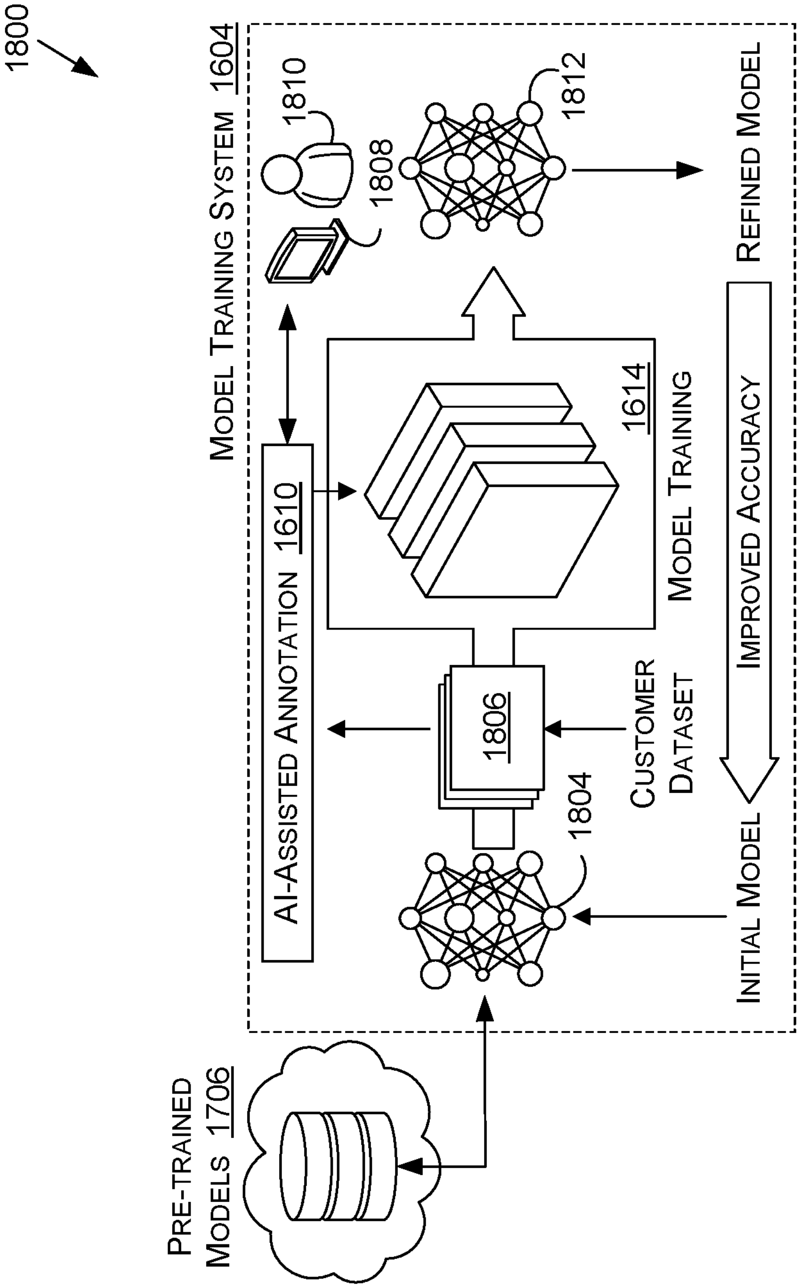
FIGS. 18A and 18B illustrate a data flow diagram for a process to train a machine learning model, as well as client-server architecture to enhance annotation tools with pre-trained annotation models, in accordance with at least one embodiment.

FIG. 18A illustrates a data flow diagram for a process 1800 to train, retrain, or update a machine learning model, in accordance with at least one embodiment. In at least one embodiment, process 1800 may be executed using, as a non-limiting example, system 1700 of FIG. 17. In at least one embodiment, process 1800 may leverage services and/or hardware as described herein. In at least one embodiment, refined models 1812 generated by process 1800 may be executed by a deployment system for one or more containerized applications in deployment pipelines.

In at least one embodiment, model training 1814 may include retraining or updating an initial model 1804 (e.g., a pre-trained model) using new training data (e.g., new input data, such as customer dataset 1806, and/or new ground truth data associated with input data). In at least one embodiment, to retrain, or update, initial model 1804, output or loss layer(s) of initial model 1804 may be reset, or deleted, and/or replaced with an updated or new output or loss layer(s). In at least one embodiment, initial model 1804 may have previously fine-tuned parameters (e.g., weights and/or biases) that remain from prior training, so training or retraining 1814 may not take as long or require as much processing as training a model from scratch. In at least one embodiment, during model training 1814, by having reset or replaced output or loss layer(s) of initial model 1804, parameters may be updated and re-tuned for a new data set based on loss calculations associated with accuracy of output or loss layer(s) at generating predictions on new, customer dataset 1806.

In at least one embodiment, pre-trained models 1806 may be stored in a data store, or registry. In at least one embodiment, pre-trained models 1806 may have been trained, at least in part, at one or more facilities other than a facility executing process 1800. In at least one embodiment, to protect privacy and rights of patients, subjects, or clients of different facilities, pre-trained models 1806 may have been trained, on-premise, using customer or patient data generated on-premise. In at least one embodiment, pre-trained models 1406 may be trained using a cloud and/or other hardware, but confidential, privacy protected patient data may not be transferred to, used by, or accessible to any components of a cloud (or other off premise hardware). In at least one embodiment, where a pre-trained model 1806 is trained at using patient data from more than one facility, pre-trained model 1806 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1806 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1806 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1804 for a training system within process 1800. In at least one embodiment, a customer dataset 1806 (e.g., imaging data, genomics data, sequencing data, or other data types generated by devices at a facility) may be used to perform model training (which may include, without limitation, transfer learning) on initial model 1804 to generate refined model 1812. In at least one embodiment, ground truth data corresponding to customer dataset 1806 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1810 may interact with a GUI via computing device 1808 to edit or fine-tune (auto)annotations. In at least one embodiment, a polygon editing feature may be used to move vertices of a polygon to more accurate or fine-tuned locations.

In at least one embodiment, once customer dataset 1806 has associated ground truth data, ground truth data (e.g., from AI-assisted annotation, manual labeling, etc.) may be used by during model training to generate refined model 1812. In at least one embodiment, customer dataset 1806 may be applied to initial model 1804 any number of times, and ground truth data may be used to update parameters of initial model 1804 until an acceptable level of accuracy is attained for refined model 1812. In at least one embodiment, once refined model 1812 is generated, refined model 1812 may be deployed within one or more deployment pipelines at a facility for performing one or more processing tasks with respect to medical imaging data.

In at least one embodiment, refined model 1812 may be uploaded to pre-trained models in a model registry to be selected by another facility. In at least one embodiment, his process may be completed at any number of facilities such that refined model 1812 may be further refined on new datasets any number of times to generate a more universal model.

Figure 18B:
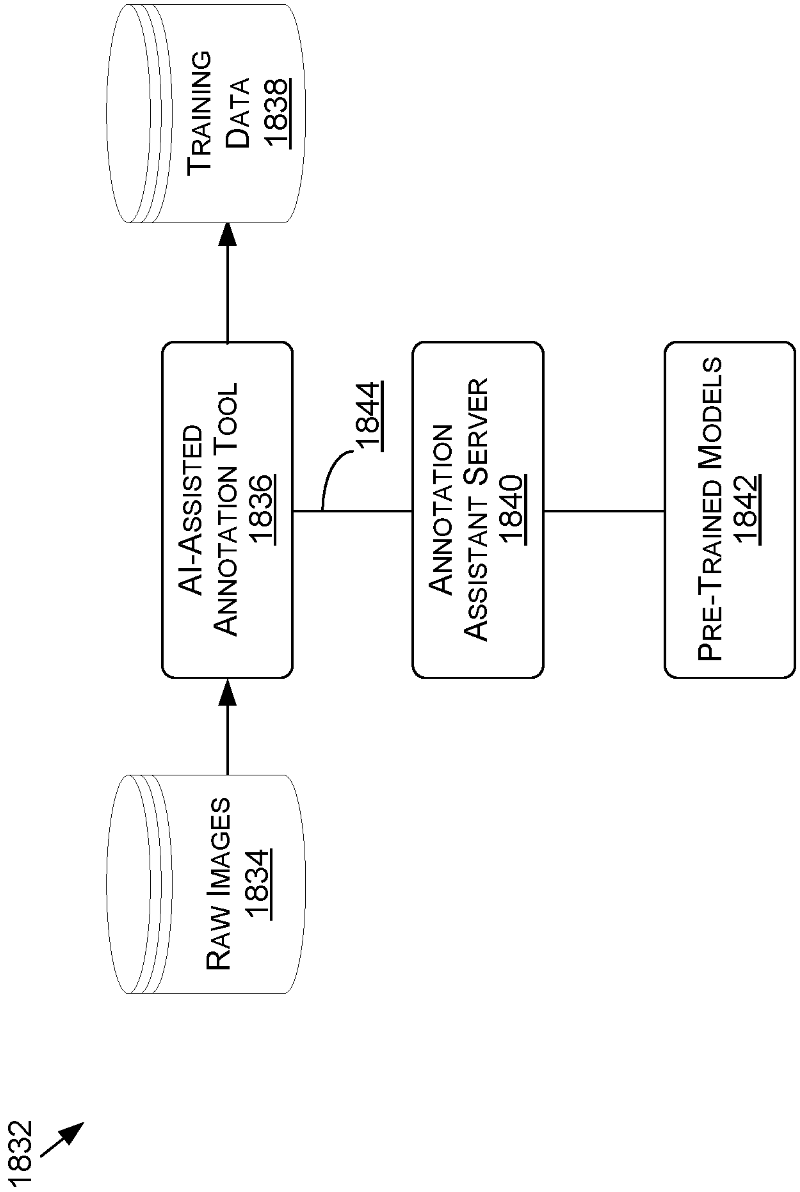

FIG. 18B is an example illustration of a client-server architecture 1832 to enhance annotation tools with pre-trained annotation models, in accordance with at least one embodiment. In at least one embodiment, AI-assisted annotation tools 1836 may be instantiated based on a client-server architecture 1832. In at least one embodiment, annotation tools 1836 in imaging applications may aid radiologists, for example, identify organs and abnormalities. In at least one embodiment, imaging applications may include software tools that help user 1810 to identify, as a non-limiting example, a few extreme points on a particular organ of interest in raw images 1834 (e.g., in a 3D MRI or CT scan) and receive auto-annotated results for all 2D slices of a particular organ. In at least one embodiment, results may be stored in a data store as training data 1838 and used as (for example and without limitation) ground truth data for training. In at least one embodiment, when computing device 1808 sends extreme points for AI-assisted annotation, a deep learning model, for example, may receive this data as input and return inference results of a segmented organ or abnormality. In at least one embodiment, pre-instantiated annotation tools, such as AI-Assisted Annotation Tool 1836B in FIG. 18B, may be enhanced by making API calls (e.g., API Call 1844) to a server, such as an Annotation Assistant Server 1840 that may include a set of pre-trained models 1842 stored in an annotation model registry, for example. In at least one embodiment, an annotation model registry may store pre-trained models 1842 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms “a” and “an” and “the” and similar referents in context of describing disclosed embodiments (especially in context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. Term “connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term “set” (e.g., “a set of items”) or “subset,” unless otherwise noted or contradicted by context, is to be construed as a nonempty collection comprising one or more members. Further, unless otherwise noted or contradicted by context, term “subset” of a corresponding set does not necessarily denote a proper subset of corresponding set, but subset and corresponding set may be equal.

Conjunctive language, such as phrases of form “at least one of A, B, and C,” or “at least one of A, B and C,” unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases “at least one of A, B, and C” and “at least one of A, B and C” refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

generating, based at least on image data representative of an environment including one or more objects, a three-dimensional (3D) representation of the environment;

analyzing the 3D representation to determine one or more segments corresponding to the one or more objects in the environment;

classifying, based at least on data for the one or more segments and the image data, first individual ones of the one or more objects as identified objects and second individual ones of the one or more objects as unidentified objects, wherein the classifying of the second individual ones of the one or more objects as the unidentified objects comprises determining that at least some of the second individual ones of the one or more objects do not have a corresponding 3D model available within an existing repository of 3D models;

generating, based on at least classifying the second individual ones of the one or more objects as unidentified objects, one or more mesh representations of the unidentified objects to be included in the 3D representation of the environment;

replacing at least a portion of the one or more segments corresponding to the identified objects with a stored portion of a 3D model selected from the existing repository of 3D models, wherein the replacing changes a number of points in a mesh representation of the environment; and providing the 3D representation of the environment including the stored portion of the 3D model and the one or more mesh representations.

2. The computer-implemented method of claim 1, further comprising:

transmitting the 3D representation of the environment, including the stored portion of the 3D model, to a cloud-hosted platform for collaborative content creation of multi-dimensional assets.

3. The computer-implemented method of claim 1, wherein the existing repository of 3D models corresponds to a plurality of objects from a digital catalog.

4. The computer-implemented method of claim 3, wherein the existing repository of 3D models is comprised in a data store of a cloud-hosted platform for collaborative content creation of multi-dimensional assets.

5. The computer-implemented method of claim 1, wherein the 3D representation comprises an oriented point cloud.

6. The computer-implemented method of claim 1, further comprising:

capturing the image data using at least one image capture device, wherein the image data includes at least two images captured from different points of view with respect to the environment.

7. The computer-implemented method of claim 6, further comprising:

determining a set of keypoints in the at least two images; and registering the at least two images based at least on the set of keypoints for use in generating the 3D representation of the environment.

8. The computer-implemented method of claim 1, further comprising:

receiving an instruction to modify one or more aspects of the one or more objects; and generating an updated 3D representation of the environment including the modified one or more aspects.

9. A processor, comprising one or more circuits configured to:

use one or more neural networks to generate, based at least on image data captured of an environment, a three-dimensional (3D) representation of the environment including specified 3D representations of one or more objects;

classify first individual ones of the one or more objects as identified objects and second individual ones of the one or more objects as unidentified objects, wherein the classifying of the second individual ones of the one or more objects as the unidentified objects comprises determining that at least some of the second individual ones of the one or more objects do not have a corresponding 3D model available within an existing repository of 3D models;

generate, based at least on the image data and classifying the second individual ones of the one or more objects as unidentified objects, one or more mesh representations of the unidentified objects to be included in the 3D representation of the environment; and replace at least a first portion of the 3D representation corresponding to the one or more identified objects with a portion of a 3D model selected from the existing repository of 3D models, and at least a second portion of the 3D representation corresponding to the one or more unidentified objects with the mesh representations, wherein the replacing changes a number of points in a mesh representation of the environment.

10. The processor of claim 9, wherein the one or more circuits are further configured to analyze segments of the 3D representation of the environment to determine an identity of at least one object, and replace at least a portion of segments with the portion of the 3D model selected from the existing repository of 3D models, wherein the existing repository corresponds to a plurality of objects from a digital catalog.

11. The processor of claim 9, wherein the one or more circuits are further configured to provide a presentation of the 3D environment using at least a portion of at least one specified 3D representation of the specified 3D representations, wherein one or more aspects of the specified 3D representations are modifiable in the presentation.

12. The processor of claim 9, wherein the one or more circuits are further configured to provide at least one specified 3D representation of the specified 3D representations of the one or more identified objects to a cloud-hosted collaborative content creation platform for multi-dimensional assets.

13. The processor of claim 12, wherein at least one specified 3D representation of the specified 3D representations includes model data corresponding to the one or more identified objects and comprised in the existing repository of 3D models corresponding to a plurality of objects.

14. The processor of claim 13, wherein the existing repository of 3D models is comprised in a data store of the cloud-hosted collaborative content creation platform for multi-dimensional assets.

15. A system, comprising:

one or more processors; and memory including instructions that, when performed by the one or more processors, cause the system to:

generate, based at least on video data captured for a space including one or more objects, a three-dimensional (3D) representation of the space;

classify first individual ones of the one or more objects as identified objects and second individual ones of the one or more objects as unidentified objects, wherein the classifying of the second individual ones of the one or more objects as the unidentified objects comprises determining that at least some of the second individual ones of the one or more objects do not have a corresponding 3D model available within an existing repository of 3D models;

replace at least a portion of the identified objects with a portion of a 3D model selected from the existing repository of 3D models, wherein the replacing changes a number of points in a mesh representation of the space;

generate, based on at least classifying the second individual ones of the one or more objects as unidentified objects, one or more mesh representations of the unidentified objects to be included in the 3D representation of the space;

provide an updated 3D representation of the space including respective 3D representations of the identified objects and the one or more mesh representations of the unidentified objects; and modify, in response to a received input, the respective 3D representations of the identified objects in at least one of selection or placement within the 3D representation of the space.

16. The system of claim 15, wherein the instructions when performed further cause the system to:

provide the respective 3D representations of the one or more objects to a cloud-hosted collaborative content creation platform for multi-dimensional assets.

17. The system of claim 15, wherein the respective 3D representations include model data corresponding to the one or more objects and comprised in the existing repository of 3D models corresponding to a plurality of objects.

18. The system of claim 17, wherein the existing repository of 3D models is comprised in a data store of a cloud-hosted collaborative content creation platform for multi-dimensional assets.

19. The system of claim 15, wherein the system comprises at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating at least one of virtual reality (VR) content, augmented reality (AR) content, or mixed reality (MR) content;

a system for presenting at least one of VR content, AR content, or MR content;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *